US012804720B2

(12) United States Patent
Abotabl et al.

(10) Patent No.: US 12,804,720 B2
(45) Date of Patent: Nov. 17, 2026

(54) SYNCHRONIZATION SIGNAL BLOCKS FOR SUBBAND FULL DUPLEX RANDOM ACCESS CHANNEL

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US); Abdelrahman Mohamed Ahmed Mohamed Ibrahim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 274 days.

(21) Appl. No.: 18/648,261

(22) Filed: Apr. 26, 2024

(65) Prior Publication Data

US 2025/0338315 A1 Oct. 30, 2025

(51) Int. Cl.

*H04W 74/0833* (2024.01)
*H04L 5/16* (2006.01)
*H04W 56/00* (2009.01)

(52) U.S. Cl.

CPC ........... *H04W 74/0833* (2013.01); *H04L 5/16* (2013.01); *H04W 56/001* (2013.01)

(58) Field of Classification Search

None

See application file for complete search history.

(56) References Cited

U.S. PATENT DOCUMENTS

2020/0162182 A1* 5/2020 Zhang .................. H04J 11/0076
2022/0095252 A1* 3/2022 Ko ........................ H04L 5/0051
2024/0137972 A1 4/2024 Abdelghaffar et al.
2024/0381444 A1* 11/2024 Han .......................... H04L 5/14

FOREIGN PATENT DOCUMENTS

WO 2024035329 A1 2/2024

OTHER PUBLICATIONS

International Search Report and Written Opinion—PCT/US2025/022233—ISA/EPO—Jun. 23, 2025.

NEC: “Discussion on Random Access for SHED”, 3GPP TSG RAN WG1 #116bis, R1-2402755, 3rd Generation Partnership Project, Mobile Competence Centre, 650, Route Des Lucioles, F-06921, Sophia-Antipolis Cedex, France, vol. RAN WG1, No. Changsha, Hunan Province, CN, Apr. 15, 2024-Apr. 19, 2024, Apr. 5, 2024, 11 Pages, XP052586748, section 2.1.3.

Sony: “SBFD RACH operations”, 3GPP TSG RAN WG1 #116, R1-2400853, 3rd Generation Partnership Project, Mobile Competence Centre, 650, Route Des Lucioles, F-06921, Sophia-Antipolis Cedex, France, vol. RAN WG1, No. Athens, GR, Feb. 26, 2024-Mar. 1, 2024, Feb. 19, 2024, 7 Pages, XP052568626, Section 2.2.

* cited by examiner

*Primary Examiner* — Hong S Cho
(74) *Attorney, Agent, or Firm* — Harrity & Harrity, LLP

(57) ABSTRACT

Various aspects of the present disclosure generally relate to wireless communication. Some aspects more specifically relate to an indication of whether a user equipment (UE) is allowed to use a beam corresponding to a transmitted synchronization signal block (SSB) for subband full duplex (SBFD) random access channel (RACH). For example, the indication may indicate whether the UE is allowed to transmit a RACH message in a RACH occasion (RO) mapped to a transmitted SSB. In some aspects, a network node may also transmit, and the UE may also receive, an (Continued)

1000 indication of which SSBs were actually transmitted in a synchronization signal (SS) burst.

20 Claims, 17 Drawing Sheets

500

```
     ServingCellConfigCommon ::=    SEQUENCE {
         physCellId                     PhysCellId                          OPTIONAL, -- Cond HOAndServCellAdd,
         downlinkConfigCommon           DownlinkConfigCommon                OPTIONAL, -- Cond HOAndServCellAdd
         uplinkConfigCommon             UplinkConfigCommon                  OPTIONAL, -- Need M
         supplementaryUplinkConfig      UplinkConfigCommon                  OPTIONAL, -- Need S
         n-TimingAdvanceOffset          ENUMERATED { n0, n25600, n39936 }   OPTIONAL, -- Need S
510 ---> ssb-PositionsInBurst           CHOICE {
             shortBitmap                    BIT STRING (SIZE (4)),
             mediumBitmap                   BIT STRING (SIZE (8)),
             longBitmap                     BIT STRING (SIZE (64))
         }                                                                  OPTIONAL, -- Cond AbsFreqSSB
```

FIGURE 5

SYNCHRONIZATION SIGNAL BLOCKS FOR SUBBAND FULL DUPLEX RANDOM ACCESS CHANNEL

FIELD OF THE DISCLOSURE

Aspects of the present disclosure generally relate to wireless communication and specifically relate to techniques, apparatuses, and methods associated with synchronization signal blocks for subband full duplex.

BACKGROUND

Wireless communication systems are widely deployed to provide various services that may include carrying voice, text, messaging, video, data, and/or other traffic. The services may include unicast, multicast, and/or broadcast services, among other examples. Typical wireless communication systems may employ multiple-access radio access technologies (RATs) capable of supporting communication with multiple users by sharing available system resources (for example, time domain resources, frequency domain resources, spatial domain resources, and/or device transmit power, among other examples). Examples of such multiple-access RATs include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

The above multiple-access RATs have been adopted in various telecommunication standards to provide common protocols that enable different wireless communication devices to communicate on a municipal, national, regional, or global level. An example telecommunication standard is New Radio (NR). NR, which may also be referred to as 5G, is part of a continuous mobile broadband evolution promulgated by the Third Generation Partnership Project (3GPP). NR (and other mobile broadband evolutions beyond NR) may be designed to better support Internet of things (IoT) and reduced capability device deployments, industrial connectivity, millimeter wave (mmWave) expansion, licensed and unlicensed spectrum access, non-terrestrial network (NTN) deployment, sidelink and other device-to-device direct communication technologies (for example, cellular vehicle-to-everything (CV2X) communication), massive multiple-input multiple-output (MIMO), disaggregated network architectures and network topology expansions, multiple-subscriber implementations, high-precision positioning, and/or radio frequency (RF) sensing, among other examples. As the demand for mobile broadband access continues to increase, further improvements in NR may be implemented, and other radio access technologies such as 6G may be introduced, to further advance mobile broadband evolution.

A first user equipment (UE) that transmits an uplink communication in a subband full duplex (SBFD) symbol may subject a second UE that receives a downlink communication in the SBFD symbol to UE-to-UE cross-link interference (CLI). For example, the uplink communication may be a random access channel (RACH) message that causes the UE-to-UE CLI. In some examples, a network node may transmit synchronization signal blocks (SSBs) associated with respective possible beams. If the first UE transmits the RACH message in a RACH occasion (RO) mapped to one of the SSBs and configured in an SBFD symbol, then the RACH message may generate severe UE-to-UE CLI, particularly in situations where the first UE is located in a densely populated area.

SUMMARY

Some aspects described herein relate to an apparatus for wireless communication at a user equipment (UE). The apparatus may include one or more memories storing processor-executable code and one or more processors coupled with the one or more memories. At least one processor of the one or more processors may be configured to cause the UE to receive a first indication of one or more transmitted synchronization signal blocks (SSBs) in a synchronization signal (SS) burst. At least one processor of the one or more processors may be configured to cause the UE to receive a second indication of at least one SSB, of the one or more transmitted SSBs, associated with an SSB to random access channel occasion (SSB-RO) mapping between the at least one SSB and at least one random access channel (RACH) occasion (RO) configured in one or more subband full duplex (SBFD) symbols. At least one processor of the one or more processors may be configured to cause the UE to transmit, in accordance with the second indication, a RACH message in the at least one RO.

Some aspects described herein relate to an apparatus for wireless communication at a network node. The apparatus may include one or more memories storing processor-executable code and one or more processors coupled with the one or more memories. At least one processor of the one or more processors may be configured to cause the network node to transmit a first indication of one or more transmitted SSBs in an SS burst. At least one processor of the one or more processors may be configured to cause the network node to transmit a second indication of at least one SSB, of the one or more transmitted SSBs, that is associated with an SSB-RO mapping between the at least one SSB and at least one RO configured in one or more SBFD symbols. At least one processor of the one or more processors may be configured to cause the network node to receive, in accordance with the second indication, a RACH message in the at least one RO.

Some aspects described herein relate to a method of wireless communication performed at a UE. The method may include receiving a first indication of one or more transmitted SSBs in an SS burst. The method may include receiving a second indication of at least one SSB, of the one or more transmitted SSBs, associated with an SSB-RO mapping between the at least one SSB and at least one RO configured in one or more SBFD symbols. The method may include transmitting, in accordance with the second indication, a RACH message in the at least one RO.

Some aspects described herein relate to a method of wireless communication performed at a network node. The method may include transmitting a first indication of one or more transmitted SSBs in an SS burst. The method may include transmitting a second indication of at least one SSB, of the one or more transmitted SSBs, that is associated with an SSB-RO mapping between the at least one SSB and at least one RO configured in one or more SBFD symbols. The method may include receiving, in accordance with the second indication, a RACH message in the at least one RO.

Some aspects described herein relate to an apparatus for wireless communication. The apparatus may include means for receiving a first indication of one or more transmitted SSBs in an SS burst. The apparatus may include means for receiving a second indication of at least one SSB, of the one or more transmitted SSBs, associated with an SSB-RO mapping between the at least one SSB and at least one RO configured in one or more SBFD symbols. The apparatus may include means for transmitting, in accordance with the second indication, a RACH message in the at least one RO.

Some aspects described herein relate to an apparatus for wireless communication. The apparatus may include means for transmitting a first indication of one or more transmitted SSBs in an SS burst. The apparatus may include means for transmitting a second indication of at least one SSB, of the one or more transmitted SSBs, that is associated with an SSB-RO mapping between the at least one SSB and at least one RO configured in one or more SBFD symbols. The apparatus may include means for receiving, in accordance with the second indication, a RACH message in the at least one RO.

Some aspects described herein relate to a non-transitory computer-readable medium storing a set of instructions for wireless communication. The set of instructions may include one or more instructions that, when executed at a UE, cause the UE to receive a first indication of one or more transmitted SSBs in an SS burst. The set of instructions may include one or more instructions that, when executed at the UE, cause the UE to receive a second indication of at least one SSB, of the one or more transmitted SSBs, associated with an SSB-RO mapping between the at least one SSB and at least one RO configured in one or more SBFD symbols. The set of instructions may include one or more instructions that, when executed at the UE, cause the UE to transmit, in accordance with the second indication, a RACH message in the at least one RO.

Some aspects described herein relate to a non-transitory computer-readable medium storing a set of instructions for wireless communication. The set of instructions may include one or more instructions that, when executed at a network node, cause the network node to transmit a first indication of one or more transmitted SSBs in an SS burst. The set of instructions may include one or more instructions that, when executed at the network node, cause the network node to transmit a second indication of at least one SSB, of the one or more transmitted SSBs, that is associated with an SSB-RO mapping between the at least one SSB and at least one RO configured in one or more SBFD symbols. The set of instructions may include one or more instructions that, when executed at the network node, cause the network node to receive, in accordance with the second indication, a RACH message in the at least one RO.

Aspects of the present disclosure may generally be implemented by or as a method, apparatus, system, computer program product, non-transitory computer-readable medium, user equipment, base station, network node, network entity, wireless communication device, and/or processing system as substantially described with reference to, and as illustrated by, the specification and accompanying drawings.

The foregoing paragraphs of this section have broadly summarized some aspects of the present disclosure. These and additional aspects and associated advantages will be described hereinafter. The disclosed aspects may be used as a basis for modifying or designing other aspects for carrying out the same or similar purposes of the present disclosure. Such equivalent aspects do not depart from the scope of the appended claims. Characteristics of the aspects disclosed herein, both their organization and method of operation, together with associated advantages, will be better understood from the following description when considered in connection with the accompanying drawings.

BRIEF DESCRIPTION OF THE DRAWINGS

The appended drawings illustrate some aspects of the present disclosure, but are not limiting of the scope of the present disclosure because the description may enable other aspects. Each of the drawings is provided for purposes of illustration and description, and not as a definition of the limits of the claims. The same or similar reference numbers in different drawings may identify the same or similar elements.

FIG. 5 is a diagram illustrating an example of an indication of one or more transmitted synchronization signal blocks (SSBs) in an SS burst.

DETAILED DESCRIPTION

Figure 1:
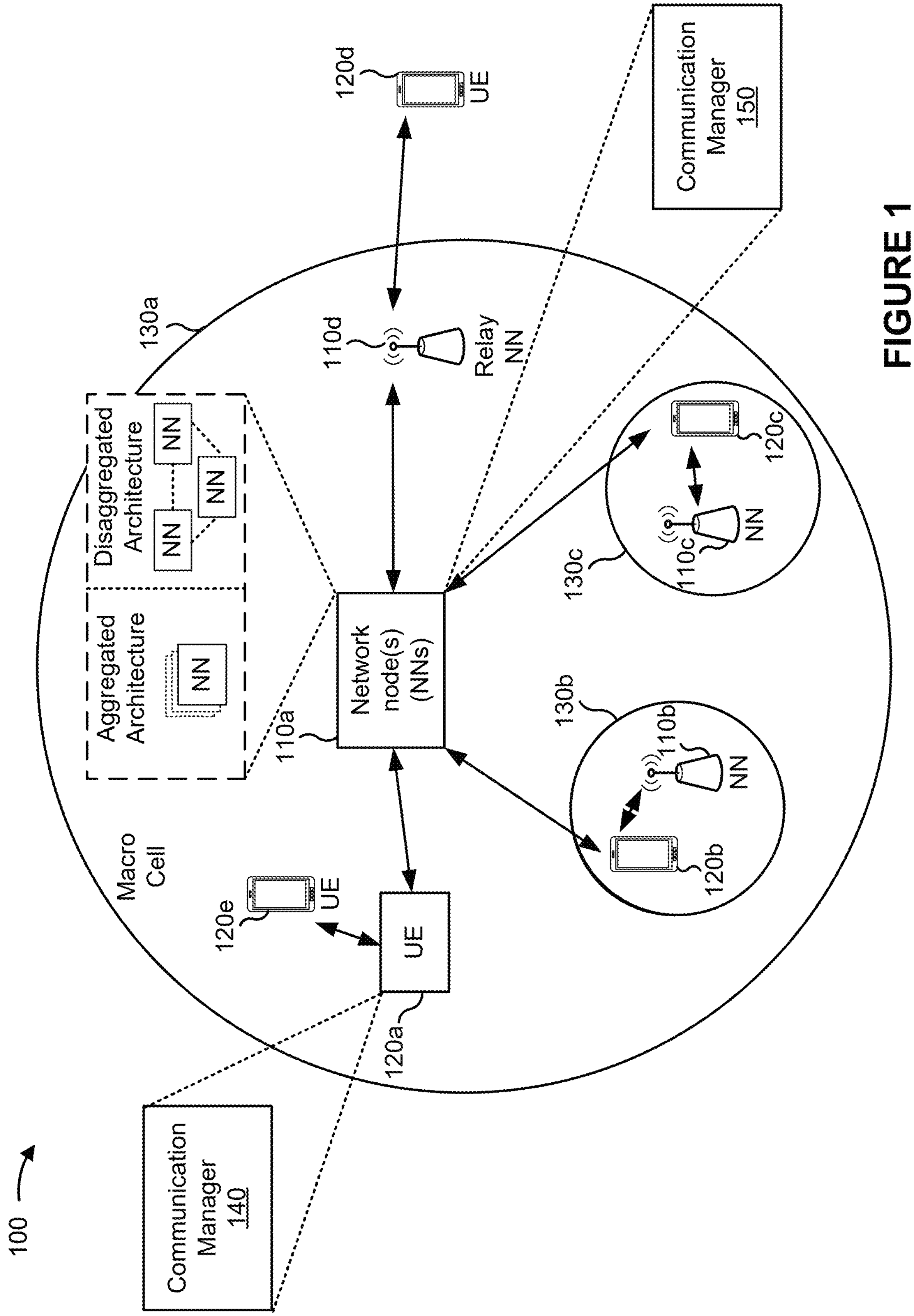
FIG. 1 is a diagram illustrating an example of a wireless communication network.

Various aspects of the present disclosure are described hereinafter with reference to the accompanying drawings. However, aspects of the present disclosure may be embodied in many different forms and is not to be construed as limited to any specific aspect illustrated by or described with reference to an accompanying drawing or otherwise presented in this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or in combination with any other aspect of the disclosure. For example, an apparatus may be implemented or a method may be practiced using various combinations or quantities of the aspects set forth herein. In addition, the scope of the disclosure is intended to cover an apparatus having, or a method that is practiced using, other structures and/or functionalities in addition to or other than the structures and/or functionalities with which various aspects of the disclosure set forth herein may be practiced. Any aspect of the disclosure disclosed herein may be embodied by one or more elements of a claim.

Several aspects of telecommunication systems will now be presented with reference to various methods, operations, apparatuses, and techniques. These methods, operations, apparatuses, and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

A network node may transmit a synchronization signal block (SSB) communication to provide control information to a user equipment (UE). For example, the network node may transmit the SSB communication to convey a primary synchronization signal (PSS), a secondary synchronization signal (SSS), and a physical broadcast channel (PBCH), among other examples. A UE may perform an initial access procedure, such as a random access channel (RACH) procedure, to obtain access to network services. For example, the UE may receive an SSB (as well as a system information block (SIB), such as SIB1) conveying control information and may transmit an initial message (for example, msg1 or msgA) of a RACH procedure (for example, a four-step or two-step RACH procedure) to trigger the RACH procedure and obtain resources for communication.

The UE may transmit a RACH message in a RACH occasion (RO), which is a resource in a time and frequency domain in which the network node is available for reception of the RACH message. In some communications systems, such as 4G/Long-Term Evolution (LTE), a single RO is configured by a radio resource control (RRC) message, such as an RRC message of a SIB2, and is applicable for each possible initial message (for example, each possible beam). In other communications systems, such as 5G or 6G, among other examples, SSBs may be associated with different possible beams, and a UE may select a particular beam for transmitting the initial message.

Accordingly, there may be a mapping of SSBs to ROs (for example, an SSB-RO mapping), which enables the network node to identify an SSB beam that a UE has selected by detecting which RO the UE used to transmit the initial message. Similarly, the mapping may be used by the UE to select an RO to use for transmitting the initial message based at least in part on an SSB that the UE has selected. By having a mapping between SSBs and ROs, the UE and the network node can remain synchronized with respect to selected communication configurations, such as selected beam parameters, thereby avoiding dropped communications.

In subband full duplex (SBFD) operation, a network node may transmit a downlink communication to a first UE and receive an uplink communication from a second UE at the same time, but on different frequency resources. The first UE that transmits the uplink communication in a SBFD symbol may subject the second UE that receives the downlink communication in the SBFD symbol to UE-to-UE cross-link interference (CLI). For example, the uplink communication may be a RACH message that causes the UE-to-UE CLI. In some examples, the network node may transmit synchronization signal blocks (SSBs) associated with respective possible beams. If the first UE transmits the RACH message in an RO mapped to one of the SSBs and configured in an SBFD symbol, then the RACH message may generate severe UE-to-UE CLI, particularly in situations where the first UE is located in a densely populated area.

Various aspects relate generally to beam-based restriction of SBFD RACH. Some aspects more specifically relate to an indication of whether a UE is allowed to use a beam corresponding to a transmitted SSB for SBFD RACH. For example, the indication may indicate whether the UE is allowed to transmit a RACH message in an RO mapped to a transmitted SSB. In some aspects, a network node may also transmit, and the UE may also receive, an indication (for example, a first bitmap) of which SSBs were actually transmitted in a synchronization signal (SS) burst.

In some aspects, the indication of whether the UE is allowed to use a beam corresponding to a transmitted SSB for SBFD RACH may be a second bitmap. In some examples, the second bitmap may include bits corresponding to each of the SSBs that could have been transmitted in the SS burst. For example, the UE may ignore the bits in the second bitmap corresponding to SSBs that were not transmitted. In some examples, the second bitmap may include bits corresponding to each of the SSBs that were actually transmitted in the SSB burst.

Particular aspects of the subject matter described in this disclosure can be implemented to realize one or more of the following potential advantages. In some examples, by transmitting or receiving the indication of whether a UE is allowed to use a beam corresponding to a transmitted SSB for SBFD RACH, the described techniques can be used to reduce UE-to-UE CLI during the one or more SBFD symbols. For example, the indication may help to restrict SBFD RACH signaling to certain spatial directions corresponding to specific beams.

The second bitmap including bits corresponding to each of the SSBs that could have been transmitted in the SS burst may enable the UE to decode the second bitmap in cases where the UE has not identified the length of the second bitmap (for example, in cases where the first and second bitmaps are transmitted together). The second bitmap including bits corresponding to each of the SSBs that were actually transmitted in the SSB burst may help to reduce overhead. For example, the second bitmap may avoid carrying bits corresponding to SSBs that were not transmitted.

Multiple-access radio access technologies (RATs) have been adopted in various telecommunication standards to provide common protocols that enable wireless communication devices to communicate on a municipal, enterprise, national, regional, or global level. For example, 5G New Radio (NR) is part of a continuous mobile broadband evolution promulgated by the Third Generation Partnership Project (3GPP). 5G NR supports various technologies and use cases including enhanced mobile broadband (eMBB), ultra-reliable low-latency communication (URLLC), massive machine-type communication (mMTC), millimeter wave (mmWave) technology, beamforming, network slicing, edge computing, Internet of Things (IoT) connectivity and management, and network function virtualization (NFV).

As the demand for broadband access increases and as technologies supported by wireless communication networks evolve, further technological improvements may be adopted in or implemented for 5G NR or future RATs, such as 6G, to further advance the evolution of wireless communication for a wide variety of existing and new use cases and applications. Such technological improvements may be associated with new frequency band expansion, licensed and unlicensed spectrum access, overlapping spectrum use, small cell deployments, non-terrestrial network (NTN) deployments, disaggregated network architectures and network topology expansion, device aggregation, advanced duplex communication, sidelink and other device-to-device direct communication, IoT (including passive or ambient IoT) networks, reduced capability (RedCap) UE functionality, industrial connectivity, multiple-subscriber implementations, high-precision positioning, radio frequency (RF) sensing, and/or artificial intelligence or machine learning (AI/ML), among other examples. These technological improvements may support use cases such as wireless backhauls, wireless data centers, extended reality (XR) and metaverse applications, meta services for supporting vehicle connectivity, holographic and mixed reality communication, autonomous and collaborative robots, vehicle platooning and cooperative maneuvering, sensing networks, gesture monitoring, human-brain interfacing, digital twin applications, asset management, and universal coverage applications using non-terrestrial and/or aerial platforms, among other examples. The methods, operations, apparatuses, and techniques described herein may enable one or more of the foregoing technologies and/or support one or more of the foregoing use cases.

FIG. 1 is a diagram illustrating an example of a wireless communication network 100. The wireless communication network 100 may be or may include elements of a 5G (or NR) network or a 6G network, among other examples. The wireless communication network 100 may include multiple network nodes 110, shown as a network node (NN) 110*a*, a network node 110*b*, a network node 110*c*, and a network node 110*d*. The network nodes 110 may support communications with multiple UEs 120, shown as a UE 120*a*, a UE 120*b*, a UE 120*c*, a UE 120*d*, and a UE 120*e*.

The network nodes 110 and the UEs 120 of the wireless communication network 100 may communicate using the electromagnetic spectrum, which may be subdivided by frequency or wavelength into various classes, bands, carriers, and/or channels. For example, devices of the wireless communication network 100 may communicate using one or more operating bands. In some aspects, multiple wireless communication networks 100 may be deployed in a given geographic area. Each wireless communication network 100 may support a particular RAT (which may also be referred to as an air interface) and may operate on one or more carrier frequencies in one or more frequency ranges. Examples of RATs include a 4G RAT, a 5G/NR RAT, and/or a 6G RAT, among other examples. In some examples, when multiple RATs are deployed in a given geographic area, each RAT in the geographic area may operate on different frequencies to avoid interference with one another.

Various operating bands have been defined as frequency range designations FR1 (410 MHz through 7.125 GHZ), FR2 (24.25 GHz through 52.6 GHz), FR3 (7.125 GHz through 24.25 GHz), FR4a or FR4-1 (52.6 GHz through 71 GHz), FR4 (52.6 GHz through 114.25 GHZ), and FR5 (114.25 GHz through 300 GHz). Although a portion of FR1 is greater than 6 GHz, FR1 is often referred to (interchangeably) as a "Sub-6 GHz" band in some documents and articles. Similarly, FR2 is often referred to (interchangeably) as a "millimeter wave" band in some documents and articles, despite being different than the extremely high frequency (EHF) band (30 GHz through 300 GHz), which is identified by the International Telecommunications Union (ITU) as a "millimeter wave" band. The frequencies between FR1 and FR2 are often referred to as mid-band frequencies, which include FR3. Frequency bands falling within FR3 may inherit FR1 characteristics or FR2 characteristics, and thus may effectively extend features of FR1 or FR2 into mid-band frequencies. Thus, "sub-6 GHz," if used herein, may broadly refer to frequencies that are less than 6 GHz, that are within FR1, and/or that are included in mid-band frequencies. Similarly, the term "millimeter wave," if used herein, may broadly refer to frequencies that are included in mid-band frequencies, that are within FR2, FR4, FR4-a or FR4-1, or FR5, and/or that are within the EHF band. Higher frequency bands may extend 5G NR operation, 6G operation, and/or other RATs beyond 52.6 GHz. For example, each of FR4a, FR4-1, FR4, and FR5 falls within the EHF band. In some examples, the wireless communication network 100 may implement dynamic spectrum sharing (DSS), in which multiple RATs (for example, 4G/LTE and 5G/NR) are implemented with dynamic bandwidth allocation (for example, based on user demand) in a single frequency band. It is contemplated that the frequencies included in these operating bands (for example, FR1, FR2, FR3, FR4, FR4-a, FR4-1, and/or FR5) may be modified, and techniques described herein may be applicable to those modified frequency ranges.

A network node 110 may include one or more devices, components, or systems that enable communication between a UE 120 and one or more devices, components, or systems of the wireless communication network 100. A network node 110 may be, may include, or may also be referred to as an NR network node, a 5G network node, a 6G network node, a Node B, an eNB, a gNB, an access point (AP), a transmission reception point (TRP), a mobility element, a core, a network entity, a network element, a network equipment, and/or another type of device, component, or system included in a radio access network (RAN).

A network node 110 may be implemented as a single physical node (for example, a single physical structure) or may be implemented as two or more physical nodes (for example, two or more distinct physical structures). For example, a network node 110 may be a device or system that implements part of a radio protocol stack, a device or system that implements a full radio protocol stack (such as a full gNB protocol stack), or a collection of devices or systems that collectively implement the full radio protocol stack. For example, and as shown, a network node 110 may be an aggregated network node (having an aggregated architecture), meaning that the network node 110 may implement a full radio protocol stack that is physically and logically integrated within a single node (for example, a single physical structure) in the wireless communication network 100. For example, an aggregated network node 110 may consist of a single standalone base station or a single TRP that uses a full radio protocol stack to enable or facilitate communication between a UE 120 and a core network of the wireless communication network 100.

Alternatively, and as also shown, a network node 110 may be a disaggregated network node (sometimes referred to as a disaggregated base station), meaning that the network node 110 may implement a radio protocol stack that is physically distributed and/or logically distributed among two or more nodes in the same geographic location or in different geographic locations. For example, a disaggregated network node may have a disaggregated architecture. In some deployments, disaggregated network nodes 110 may be used in an integrated access and backhaul (IAB) network, in an open radio access network (O-RAN) (such as a network configuration in compliance with the O-RAN Alliance), or in a virtualized radio access network (vRAN), also known as a cloud radio access network (C-RAN), to facilitate scaling by separating base station functionality into multiple units that can be individually deployed.

The network nodes 110 of the wireless communication network 100 may include one or more central units (CUs), one or more distributed units (DUs), and/or one or more radio units (RUs). A CU may host one or more higher layer control functions, such as RRC functions, packet data convergence protocol (PDCP) functions, and/or service data adaptation protocol (SDAP) functions, among other examples. A DU may host one or more of a radio link control (RLC) layer, a medium access control (MAC) layer, and/or one or more higher physical (PHY) layers depending, at least in part, on a functional split, such as a functional split defined by the 3GPP. In some examples, a DU also may host one or more lower PHY layer functions, such as a fast Fourier transform (FFT), an inverse FFT (iFFT), beamforming, physical random access channel (PRACH) extraction and filtering, and/or scheduling of resources for one or more UEs 120, among other examples. An RU may host RF processing functions or lower PHY layer functions, such as an FFT, an iFFT, beamforming, or PRACH extraction and filtering, among other examples, according to a functional split, such as a lower layer functional split. In such an architecture, each RU can be operated to handle over the air (OTA) communication with one or more UEs 120.

In some aspects, a single network node 110 may include a combination of one or more CUs, one or more DUs, and/or one or more RUs. Additionally or alternatively, a network node 110 may include one or more Near-Real Time (Near-RT) RAN Intelligent Controllers (RICs) and/or one or more Non-Real Time (Non-RT) RICs. In some examples, a CU, a DU, and/or an RU may be implemented as a virtual unit, such as a virtual central unit (VCU), a virtual distributed unit (VDU), or a virtual radio unit (VRU), among other examples. A virtual unit may be implemented as a virtual network function, such as associated with a cloud deployment.

Some network nodes 110 (for example, a base station, an RU, or a TRP) may provide communication coverage for a particular geographic area. In the 3GPP, the term "cell" can refer to a coverage area of a network node 110 or to a network node 110 itself, depending on the context in which the term is used. A network node 110 may support one or multiple (for example, three) cells. In some examples, a network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node.

The wireless communication network 100 may be a heterogeneous network that includes network nodes 110 of different types, such as macro network nodes, pico network nodes, femto network nodes, relay network nodes, aggregated network nodes, and/or disaggregated network nodes, among other examples. In the example shown in FIG. 1, the network node 110*a* may be a macro network node for a macro cell 130*a*, the network node 110*b* may be a pico network node for a pico cell 130*b*, and the network node 110*c* may be a femto network node for a femto cell 130*c*.Various different types of network nodes 110 may generally transmit at different power levels, serve different coverage areas, and/or have different impacts on interference in the wireless communication network 100 than other types of network nodes 110. For example, macro network nodes may have a high transmit power level (for example, 5 to 40 watts), whereas pico network nodes, femto network nodes, and relay network nodes may have lower transmit power levels (for example, 0.1 to 2 watts).

In some examples, a network node 110 may be, may include, or may operate as an RU, a TRP, or a base station that communicates with one or more UEs 120 via a radio access link (which may be referred to as a "Uu" link). The radio access link may include a downlink and an uplink. "Downlink" (or "DL") refers to a communication direction from a network node 110 to a UE 120, and "uplink" (or "UL") refers to a communication direction from a UE 120 to a network node 110.

In some examples, any network node 110 that relays communications may be referred to as a relay network node, a relay station, or simply as a relay. A relay may receive a transmission of a communication from an upstream station (for example, another network node 110 or a UE 120) and transmit the communication to a downstream station (for example, a UE 120 or another network node 110). In this case, the wireless communication network 100 may include or be referred to as a "multi-hop network." In the example shown in FIG. 1, the network node 110*d* (for example, a relay network node) may communicate with the network node 110*a* (for example, a macro network node) and the UE 120*d* in order to facilitate communication between the network node 110*a* and the UE 120*d*. Additionally or alternatively, a UE 120 may be or may operate as a relay station that can relay transmissions to or from other UEs 120. A UE 120 that relays communications may be referred to as a UE relay or a relay UE, among other examples.

The UEs 120 may be physically dispersed throughout the wireless communication network 100, and each UE 120 may be stationary or mobile. A UE 120 may be, may include, or may be included in an access terminal, another terminal, a mobile station, or a subscriber unit. A UE 120 may be, include, or be coupled with a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, and/or smart jewelry, such as a smart ring or a smart bracelet), an entertainment device (for example, a music device, a video device, and/or a satellite radio), an XR device, a vehicular component or sensor, a smart meter or sensor, industrial manufacturing equipment, a Global Navigation Satellite System (GNSS) device (such as a Global Positioning System device or another type of positioning device), a UE function of a network node, and/or any other suitable device or function that may communicate via a wireless medium.

A UE 120 and/or a network node 110 may include one or more chips, system-on-chips (SoCs), chipsets, packages, or devices that individually or collectively constitute or comprise a processing system. The processing system includes processor (or "processing") circuitry in the form of one or multiple processors, microprocessors, processing units (such as central processing units (CPUs), graphics processing units (GPUs), neural processing units (NPUs) and/or digital signal processors (DSPs)), processing blocks, application-specific integrated circuits (ASIC), programmable logic devices (PLDs) (such as field programmable gate arrays (FPGAs)), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein. A group of processors collectively configurable or configured to perform a set of functions may include a first processor configurable or configured to perform a first function of the set and a second processor configurable or configured to perform a second function of the set, or may include the group of processors all being configured or configurable to perform the set of functions.

The processing system may further include memory circuitry in the form of one or more memory devices, memory blocks, memory elements or other discrete gate or transistor logic or circuitry, each of which may include tangible storage media such as random-access memory (RAM) or read-only memory (ROM), or combinations thereof (all of which may be generally referred to herein individually as "memories" or collectively as "the memory" or "the memory circuitry"). One or more of the memories may be coupled (for example, operatively coupled, communicatively coupled, electronically coupled, or electrically coupled) with one or more of the processors and may individually or collectively store processor-executable code (such as software) that, when executed by one or more of the processors, may configure one or more of the processors to perform various functions or operations described herein. Additionally or alternatively, in some examples, one or more of the processors may be preconfigured to perform various functions or operations described herein without requiring configuration by software. The processing system may further include or be coupled with one or more modems (such as a Wi-Fi (for example, Institute of Electrical and Electronics Engineers (IEEE) compliant) modem or a cellular (for example, 3GPP 4G LTE, 5G, or 6G compliant) modem). In some implementations, one or more processors of the processing system include or implement one or more of the modems. The processing system may further include or be coupled with multiple radios (collectively "the radio"), multiple RF chains, or multiple transceivers, each of which may in turn be coupled with one or more of multiple antennas. In some implementations, one or more processors of the processing system include or implement one or more of the radios, RF chains or transceivers. The UE 120 may include or may be included in a housing that houses components associated with the UE 120 including the processing system.

In some examples, two or more UEs 120 (for example, shown as UE **120*a* and UE 120*e*) may communicate directly with one another using sidelink communications (for example, without communicating by way of a network node 110 as an intermediary). As an example, the UE 120*a* may directly transmit data, control information, or other signaling as a sidelink communication to the UE 120*e*. This is in contrast to, for example, the UE 120*a* first transmitting data in an UL communication to a network node 110, which then transmits the data to the UE 120*e*** in a DL communication.

In some aspects, the UE 120 may include a communication manager 140. As described in more detail elsewhere herein, the communication manager 140 may receive a first indication of one or more transmitted SSBs in an SS burst; receive a second indication of at least one SSB, of the one or more transmitted SSBs, associated with an SSB-RO mapping between the at least one SSB and at least one RO configured in one or more SBFD symbols; and transmit, in accordance with the second indication, a RACH message in the at least one RO. Additionally or alternatively, the communication manager 140 may perform one or more other operations described herein.

In some aspects, the network node 110 may include a communication manager 150. As described in more detail elsewhere herein, the communication manager 150 may transmit a first indication of one or more transmitted SSBs in an SS burst; transmit a second indication of at least one SSB, of the one or more transmitted SSBs, that is associated with an SSB-RO mapping between the at least one SSB and at least one RO configured in one or more SBFD symbols; and receive, in accordance with the second indication, a RACH message in the at least one RO. Additionally or alternatively, the communication manager 150 may perform one or more other operations described herein.

Figure 2:
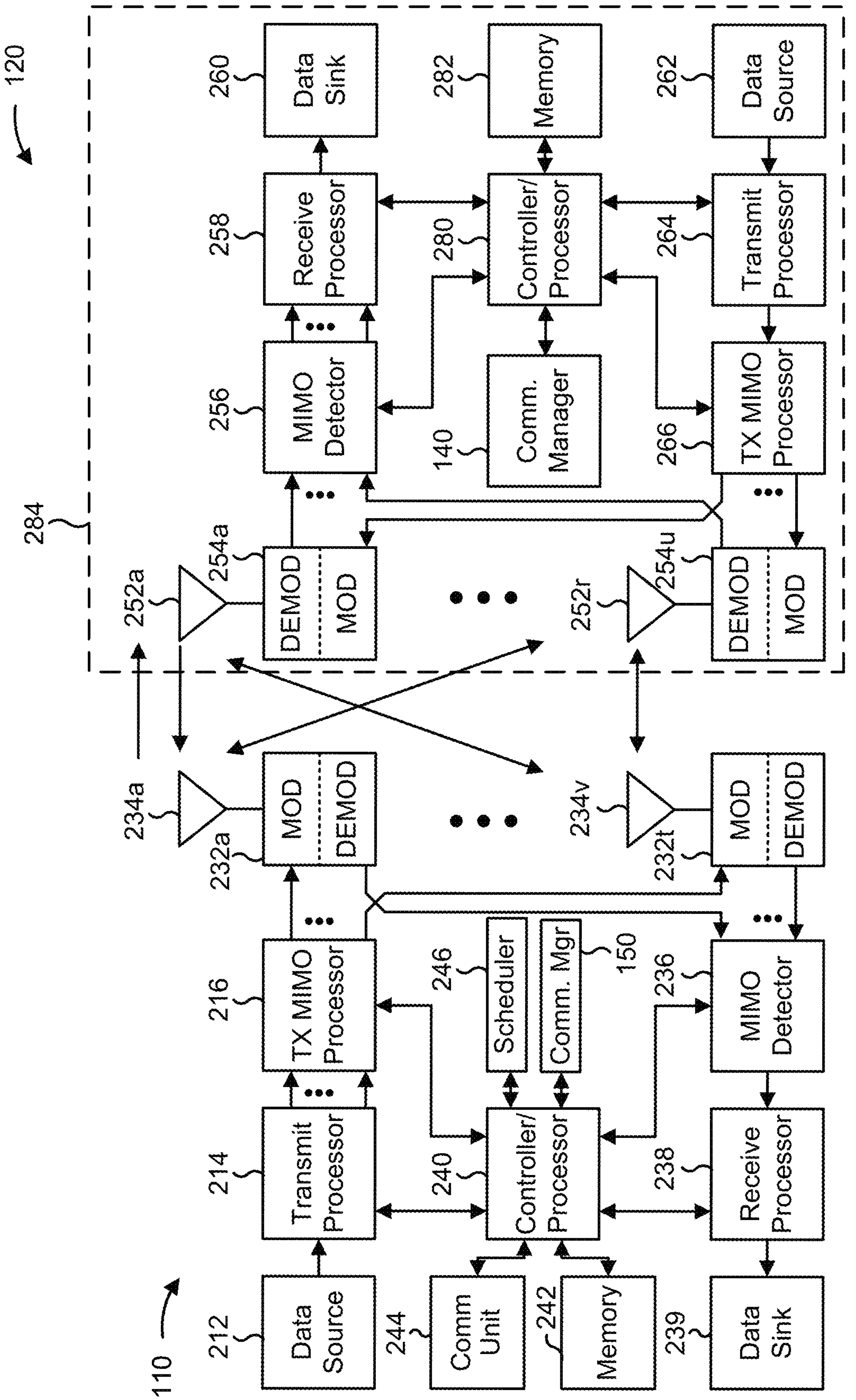
FIG. 2 is a diagram illustrating an example network node in communication with an example user equipment (UE) in a wireless network.

FIG. 2 is a diagram illustrating an example network node 110 in communication with an example UE 120 in a wireless network.

As shown in FIG. 2, the network node 110 may include a data source 212, a transmit processor 214, a transmit (TX) MIMO processor 216, a set of modems 232 (shown as **232*a* through 232*t*, where $t \geq 1$), a set of antennas 234 (shown as 234*a* through 234*v*, where $v \geq 1$), a MIMO detector 236, a receive processor 238, a data sink 239, a controller/processor 240, a memory 242, a communication unit 244, a scheduler 246, and/or a communication manager 150, among other examples. In some configurations, one or a combination of the antenna(s) 234, the modem(s) 232, the MIMO detector 236, the receive processor 238, the transmit processor 214, and/or the TX MIMO processor 216 may be included in a transceiver of the network node 110. The transceiver may be under control of and used by one or more processors, such as the controller/processor 240, and in some aspects in conjunction with processor-readable code stored in the memory 242, to perform aspects of the methods, processes, and/or operations described herein. In some aspects, the network node 110 may include one or more interfaces, communication components, and/or other components that facilitate communication with the UE 120** or another network node.

The terms "processor," "controller," or "controller/processor" may refer to one or more controllers and/or one or more processors. For example, reference to "a/the processor" or "a/the controller/processor," among other examples (in the singular) should be understood to refer to any one or more of the processors described in connection with FIG. 2, such as a single processor or a combination of multiple different processors. Reference to "one or more processors" should be understood to refer to any one or more of the processors described in connection with FIG. 2. For example, one or more processors of the network node 110 may include transmit processor 214, TX MIMO processor 216, MIMO detector 236, receive processor 238, and/or controller/processor 240. Similarly, one or more processors of the UE 120 may include MIMO detector 256, receive processor 258, transmit processor 264, TX MIMO processor 266, and/or controller/processor 280.

In some aspects, a single processor may perform all of the operations described as being performed by the one or more processors. In some aspects, a first set of (one or more) processors of the one or more processors may perform a first operation described as being performed by the one or more processors, and a second set of (one or more) processors of the one or more processors may perform a second operation described as being performed by the one or more processors. The first set of processors and the second set of processors may be the same set of processors or may be different sets of processors. Reference to "one or more memories" should be understood to refer to any one or more memories of a corresponding device, such as the memory described in connection with FIG. 2. For example, operation described as being performed by one or more memories can be performed by the same subset of the one or more memories or different subsets of the one or more memories.

For downlink communication from the network node 110 to the UE 120, the transmit processor 214 may receive data ("downlink data") intended for the UE 120 (or a set of UEs that includes the UE 120) from the data source 212 (such as a data pipeline or a data queue). In some examples, the transmit processor 214 may select one or more MCSs for the UE 120 in accordance with one or more channel quality indicators (CQIs) received from the UE 120. The network node 110 may process the data (for example, including encoding the data) for transmission to the UE 120 on a downlink in accordance with the MCS(s) selected for the UE 120 to generate data symbols. The transmit processor 214 may process system information (for example, semi-static resource partitioning information (SRPI)) and/or control information (for example, CQI requests, grants, and/or upper layer signaling) and provide overhead symbols and/or control symbols. The transmit processor 214 may generate reference symbols for reference signals (for example, a cell-specific reference signal (CRS), a demodulation reference signal (DMRS), or a channel state information (CSI) reference signal (CSI-RS)) and/or synchronization signals (for example, a primary synchronization signal (PSS) or a secondary synchronization signals (SSS)).

The TX MIMO processor 216 may perform spatial processing (for example, precoding) on the data symbols, the control symbols, the overhead symbols, and/or the reference symbols, if applicable, and may provide a set of output symbol streams (for example, T output symbol streams) to the set of modems 232. For example, each output symbol stream may be provided to a respective modulator component (shown as MOD) of a modem 232. Each modem 232 may use the respective modulator component to process (for example, to modulate) a respective output symbol stream (for example, for orthogonal frequency division multiplexing (OFDM)) to obtain an output sample stream. Each modem 232 may further use the respective modulator component to process (for example, convert to analog, amplify, filter, and/or upconvert) the output sample stream to obtain a time domain downlink signal. The modems 232*a* through 232*t* may together transmit a set of downlink signals (for example, T downlink signals) via the corresponding set of antennas 234.

For uplink communication from the UE 120 to the network node 110, uplink signals from the UE 120 may be received by an antenna 234, may be processed by a modem 232 (for example, a demodulator component, shown as DEMOD, of a modem 232), may be detected by the MIMO detector 236 (for example, a receive (Rx) MIMO processor) if applicable, and/or may be further processed by the receive processor 238 to obtain decoded data and/or control information. The receive processor 238 may provide the decoded data to a data sink 239 (which may be a data pipeline, a data queue, and/or another type of data sink) and provide the decoded control information to a processor, such as the controller/processor 240.

The network node 110 may use the scheduler 246 to schedule one or more UEs 120 for downlink or uplink communications. In some aspects, the scheduler 246 may use downlink control information (DCI) to dynamically schedule DL transmissions to the UE 120 and/or UL transmissions from the UE 120. In some examples, the scheduler 246 may allocate recurring time domain resources and/or frequency domain resources that the UE 120 may use to transmit and/or receive communications using an RRC configuration (for example, a semi-static configuration), for example, to perform semi-persistent scheduling (SPS) or to configure a configured grant (CG) for the UE 120.

One or more of the transmit processor 214, the TX MIMO processor 216, the modem 232, the antenna 234, the MIMO detector 236, the receive processor 238, and/or the controller/processor 240 may be included in an RF chain of the network node 110. An RF chain may include one or more filters, mixers, oscillators, amplifiers, analog-to-digital converters (ADCs), and/or other devices that convert between an analog signal (such as for transmission or reception via an air interface) and a digital signal (such as for processing by one or more processors of the network node 110). In some aspects, the RF chain may be or may be included in a transceiver of the network node 110.

In some examples, the network node 110 may use the communication unit 244 to communicate with a core network and/or with other network nodes. The communication unit 244 may support wired and/or wireless communication protocols and/or connections, such as Ethernet, optical fiber, common public radio interface (CPRI), and/or a wired or wireless backhaul, among other examples. The network node 110 may use the communication unit 244 to transmit and/or receive data associated with the UE 120 or to perform network control signaling, among other examples. The communication unit 244 may include a transceiver and/or an interface, such as a network interface.

The UE 120 may include a set of antennas 252 (shown as antennas 252*a* through 252*r*, where r≥1), a set of modems 254 (shown as modems 254*a* through 254*u*, where u≥1), a MIMO detector 256, a receive processor 258, a data sink 260, a data source 262, a transmit processor 264, a TX MIMO processor 266, a controller/processor 280, a memory 282, and/or a communication manager 140, among other examples. One or more of the components of the UE 120 may be included in a housing 284. In some aspects, one or a combination of the antenna(s) 252, the modem(s) 254, the MIMO detector 256, the receive processor 258, the transmit processor 264, or the TX MIMO processor 266 may be included in a transceiver that is included in the UE 120. The transceiver may be under control of and used by one or more processors, such as the controller/processor 280, and in some aspects in conjunction with processor-readable code stored in the memory 282, to perform aspects of the methods, processes, or operations described herein. In some aspects, the UE 120 may include another interface, another communication component, and/or another component that facilitates communication with the network node 110 and/or another UE 120.

For downlink communication from the network node 110 to the UE 120, the set of antennas 252 may receive the downlink communications or signals from the network node 110 and may provide a set of received downlink signals (for example, R received signals) to the set of modems 254. For example, each received signal may be provided to a respective demodulator component (shown as DEMOD) of a modem 254. Each modem 254 may use the respective demodulator component to condition (for example, filter, amplify, downconvert, and/or digitize) a received signal to obtain input samples. Each modem 254 may use the respective demodulator component to further demodulate or process the input samples (for example, for OFDM) to obtain received symbols. The MIMO detector 256 may obtain received symbols from the set of modems 254, may perform MIMO detection on the received symbols if applicable, and may provide detected symbols. The receive processor 258 may process (for example, decode) the detected symbols, may provide decoded data for the UE 120 to the data sink 260 (which may include a data pipeline, a data queue, and/or an application executed on the UE 120), and may provide decoded control information and system information to the controller/processor 280.

For uplink communication from the UE 120 to the network node 110, the transmit processor 264 may receive and process data ("uplink data") from a data source 262 (such as a data pipeline, a data queue, and/or an application executed on the UE 120) and control information from the controller/processor 280. The control information may include one or more parameters, feedback, one or more signal measurements, and/or other types of control information. In some aspects, the receive processor 258 and/or the controller/processor 280 may identify, for a received signal (such as received from the network node 110 or another UE), one or more parameters relating to transmission of the uplink communication. The one or more parameters may include a reference signal received power (RSRP) parameter, a received signal strength indicator (RSSI) parameter, a reference signal received quality (RSRQ) parameter, a CQI parameter, or a transmit power control (TPC) parameter, among other examples. The control information may include an indication of the RSRP parameter, the RSSI parameter, the RSRQ parameter, the CQI parameter, the TPC parameter, and/or another parameter. The control information may facilitate parameter selection and/or scheduling for the UE 120 by the network node 110.

The transmit processor 264 may generate reference symbols for one or more reference signals, such as an uplink DMRS, an uplink sounding reference signal (SRS), and/or another type of reference signal. The symbols from the transmit processor 264 may be precoded by the TX MIMO processor 266, if applicable, and further processed by the set of modems 254 (for example, for DFT-s-OFDM or CP-OFDM). The TX MIMO processor 266 may perform spatial processing (for example, precoding) on the data symbols, the control symbols, the overhead symbols, and/or the reference symbols, if applicable, and may provide a set of output symbol streams (for example, U output symbol streams) to the set of modems 254. For example, each output symbol stream may be provided to a respective modulator component (shown as MOD) of a modem 254. Each modem 254 may use the respective modulator component to process (for example, to modulate) a respective output symbol stream (for example, for OFDM) to obtain an output sample stream. Each modem 254 may further use the respective modulator component to process (for example, convert to analog, amplify, filter, and/or upconvert) the output sample stream to obtain an uplink signal.

The modems 254*a* through 254*u* may transmit a set of uplink signals (for example, R uplink signals or U uplink symbols) via the corresponding set of antennas 252. An uplink signal may include an uplink control information (UCI) communication, a MAC control element (MAC-CE) communication, an RRC communication, or another type of uplink communication. Uplink signals may be transmitted on a physical uplink shared channel (PUSCH), a physical uplink control channel (PUCCH), and/or another type of uplink channel. An uplink signal may carry one or more transport blocks (TBs) of data. Sidelink data and control transmissions (that is, transmissions directly between two or more UEs 120) may generally use similar techniques as were described for uplink data and control transmission, and may use sidelink-specific channels such as a physical sidelink shared channel (PSSCH), a physical sidelink control channel (PSCCH), and/or a physical sidelink feedback channel (PSFCH).

One or more antennas of the set of antennas 252 or the set of antennas 234 may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled with one or more transmission or reception components, such as one or more components of FIG. 2. As used herein, "antenna" can refer to one or more antennas, one or more antenna panels, one or more antenna groups, one or more sets of antenna elements, or one or more antenna arrays. "Antenna panel" can refer to a group of antennas (such as antenna elements) arranged in an array or panel, which may facilitate beamforming by manipulating parameters of the group of antennas. "Antenna module" may refer to circuitry including one or more antennas, which may also include one or more other components (such as filters, amplifiers, or processors) associated with integrating the antenna module into a wireless communication device.

In some examples, each of the antenna elements of an antenna 234 or an antenna 252 may include one or more sub-elements for radiating or receiving radio frequency signals. For example, a single antenna element may include a first sub-element cross-polarized with a second sub-element that can be used to independently transmit cross-polarized signals. The antenna elements may include patch antennas, dipole antennas, and/or other types of antennas arranged in a linear pattern, a two-dimensional pattern, or another pattern. A spacing between antenna elements may be such that signals with a desired wavelength transmitted separately by the antenna elements may interact or interfere constructively and destructively along various directions (such as to form a desired beam). For example, given an expected range of wavelengths or frequencies, the spacing may provide a quarter wavelength, a half wavelength, or another fraction of a wavelength of spacing between neighboring antenna elements to allow for the desired constructive and destructive interference patterns of signals transmitted by the separate antenna elements within that expected range. The amplitudes and/or phases of signals transmitted via antenna elements and/or sub-elements may be modulated and shifted relative to each other (such as by manipulating phase shift, phase offset, and/or amplitude) to generate one or more beams, which is referred to as beamforming. The term "beam" may refer to a directional transmission of a wireless signal toward a receiving device or otherwise in a desired direction. "Beam" may also generally refer to a direction associated with such a directional signal transmission, a set of directional resources associated with the signal transmission (for example, an angle of arrival, a horizontal direction, and/or a vertical direction), and/or a set of parameters that indicate one or more aspects of a directional signal, a direction associated with the signal, and/or a set of directional resources associated with the signal.

The network node 110, the controller/processor 240 of the network node 110, the UE 120, the controller/processor 280 of the UE 120, a CU, a DU, an RU, or any other component (s) of FIG. 1 or 2 may implement one or more techniques or perform one or more operations associated with SSB for SBFD, as described in more detail elsewhere herein. For example, the controller/processor 240 of the network node 110, the controller/processor 280 of the UE 120, any other component(s) of FIG. 2, the CU, the DU, or the RU may perform or direct operations of, for example, process 1400 of FIG. 14, process 1500 of FIG. 15, or other processes as described herein (alone or in conjunction with one or more other processors). The memory 242 may store data and program codes for the network node 110, the network node 110, the CU, the DU, or the RU. The memory 282 may store data and program codes for the UE 120. In some examples, the memory 242 or the memory 282 may include a non-transitory computer-readable medium storing a set of instructions (for example, code or program code) for wireless communication. The memory 242 may include one or more memories, such as a single memory or multiple different memories (of the same type or of different types). The memory 282 may include one or more memories, such as a single memory or multiple different memories (of the same type or of different types). For example, the set of instructions, when executed (for example, directly, or after compiling, converting, or interpreting) by one or more processors of the network node 110, the UE 120, the CU, the DU, or the RU, may cause the one or more processors to perform process 1400 of FIG. 14, process 1500 of FIG. 15, or other processes as described herein. In some examples, executing instructions may include running the instructions, converting the instructions, compiling the instructions, and/or interpreting the instructions, among other examples.

In some aspects, the UE 120 includes means for receiving a first indication of one or more transmitted SSBs in an SS burst; means for receiving a second indication of at least one SSB, of the one or more transmitted SSBs, associated with an SSB-RO mapping between the at least one SSB and at least one RO configured in one or more SBFD symbols; and/or means for transmitting, in accordance with the second indication, a RACH message in the at least one RO. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node 110 includes means for transmitting a first indication of one or more transmitted SSBs in an SS burst; means for transmitting a second indication of at least one SSB, of the one or more transmitted SSBs, that is associated with an SSB-RO mapping between the at least one SSB and at least one RO configured in one or more SBFD symbols; and/or means for receiving, in accordance with the second indication, a RACH message in the at least one RO. The means for the network node 110 to perform operations described herein may include, for example, one or more of communication manager 150, transmit processor 214, TX MIMO processor 216, modem 232, antenna 234, MIMO detector 236, receive processor 238, controller/processor 240, memory 242, or scheduler 246.

Figure 3:
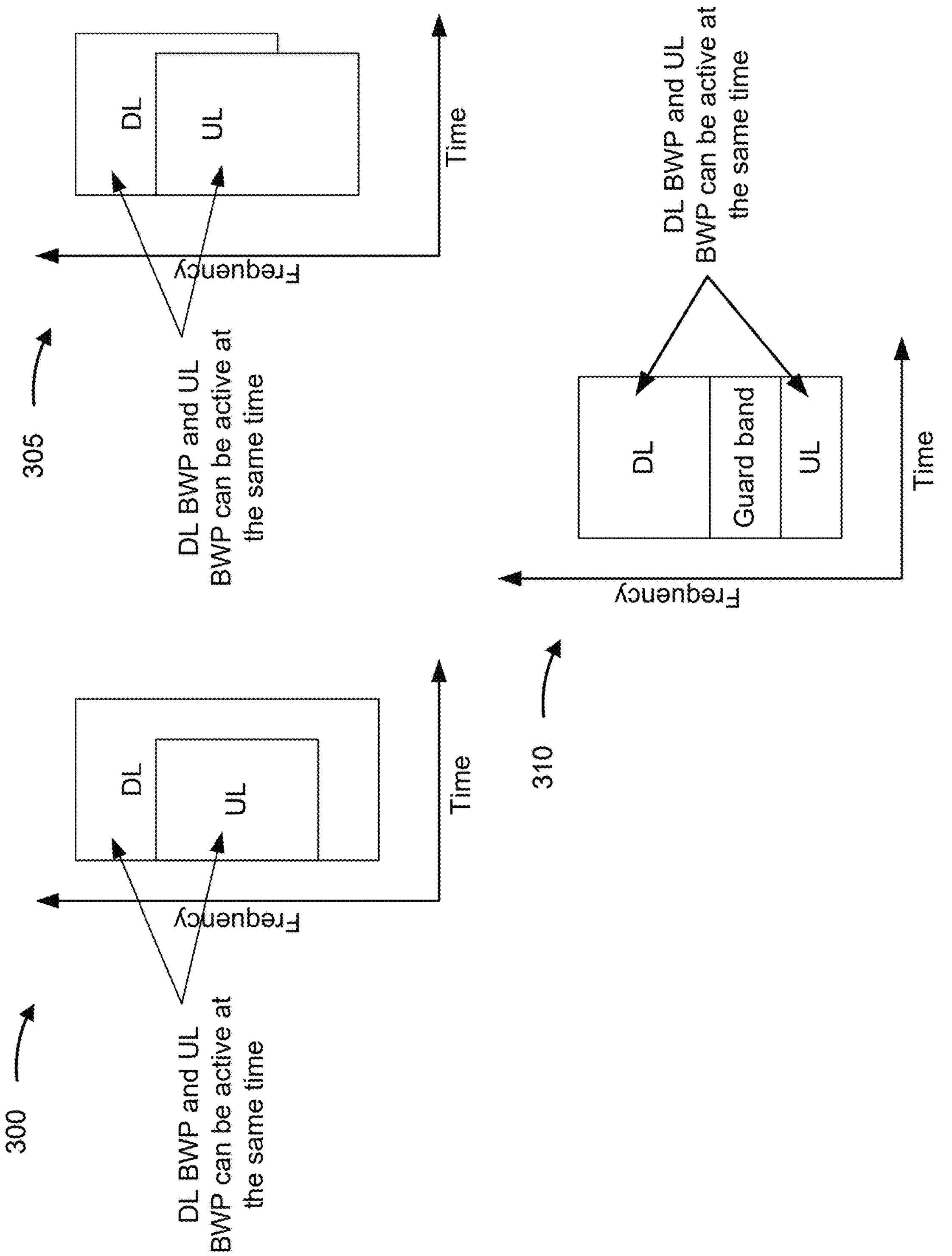
FIG. 3 is a diagram illustrating examples of full-duplex communication in a wireless network.

FIG. 3 is a diagram illustrating examples 300, 305, and 310 of full-duplex communication in a wireless network. "Full-duplex communication" in a wireless network refers to simultaneous bi-directional communication between devices in the wireless network. For example, a UE operating in a full-duplex mode may transmit an uplink communication and receive a downlink communication at the same time (for example, in the same slot or the same symbol). "Half-duplex communication" in a wireless network refers to unidirectional communications (for example, only downlink communication or only uplink communication) between devices at a given time (for example, in a given slot or a given symbol).

As shown in FIG. 3, examples 300 and 305 show examples of in-band full-duplex (IBFD) communication. In IBFD, a UE may transmit an uplink communication to a network node and receive a downlink communication from the network node on the same time and frequency resources. As shown in example 300, in a first example of IBFD, the time and frequency resources for uplink communication may fully overlap with the time and frequency resources for downlink communication. As shown in example 305, in a second example of IBFD, the time and frequency resources for uplink communication may partially overlap with the time and frequency resources for downlink communication.

As further shown in FIG. 3, example 310 shows an example of SBFD communication, which may also be referred to as "subband frequency division duplex" (SBFDD) or "flexible duplex." In SBFD, a UE may transmit an uplink communication to a network node and receive a downlink communication from the network node at the same time, but on different frequency resources. For example, the different frequency resources may be subbands of a frequency band, such as a time division duplexing band. In this case, the frequency resources used for downlink communication may be separated from the frequency resources used for uplink communication, in the frequency domain, by a guard band. Some implementations described herein may involve transmitting a RACH message in a RACH occasion configured in an SBFD symbol, such as a symbol with frequency resources configured as shown in example 310.

Figure 4:
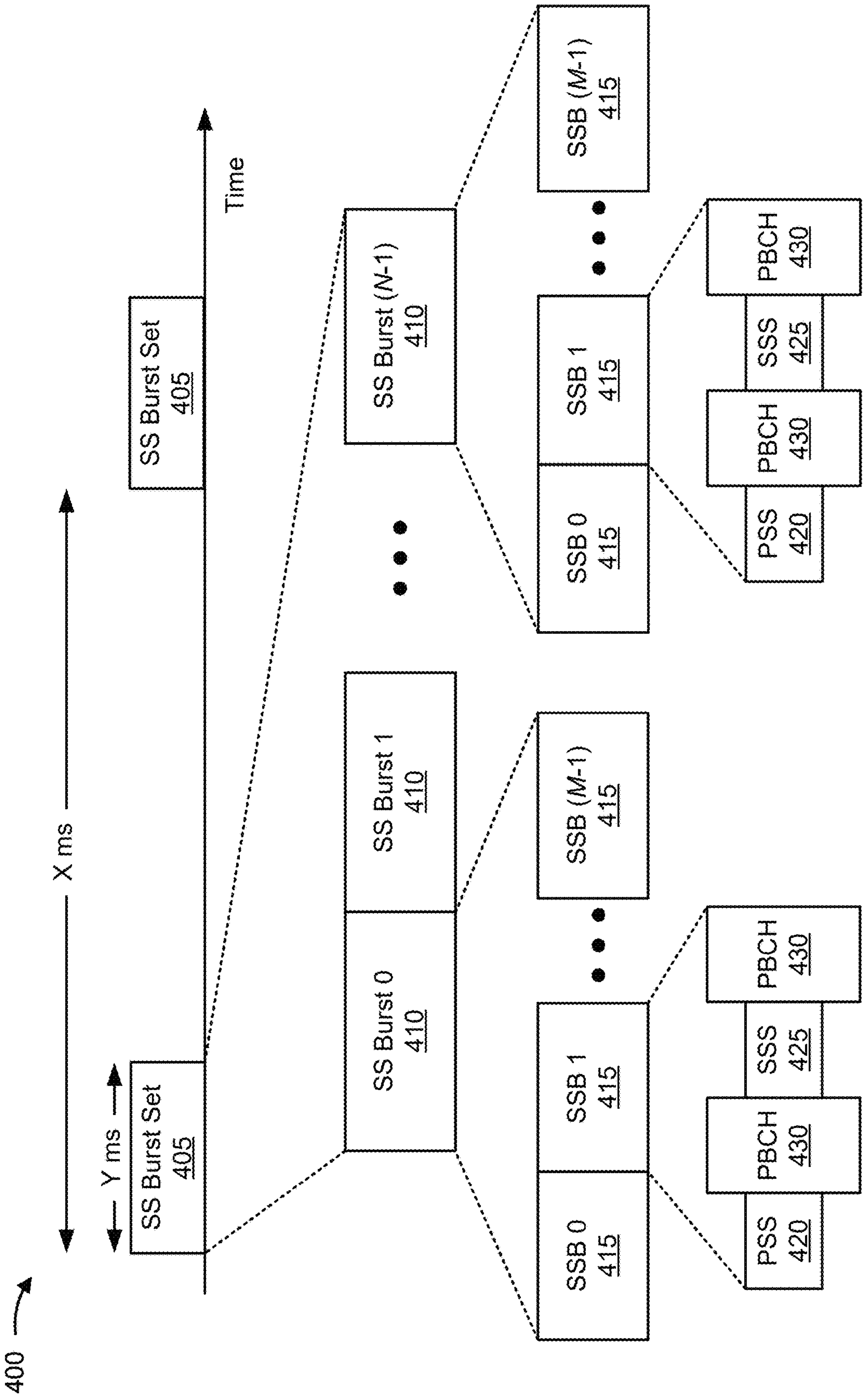
FIG. 4 is a diagram illustrating an example of a synchronization signal (SS) hierarchy.

FIG. 4 is a diagram illustrating an example 400 of an SS hierarchy. As shown in FIG. 4, the SS hierarchy may include an SS burst set 405, which may include multiple SS bursts 410, shown as SS burst 0 through SS burst N−1, where Nis a maximum quantity of repetitions of the SS burst 410 that may be transmitted by one or more network nodes. As further shown, each SS burst 410 may include one or more SSBs 415, shown as SSB 0 through SSB M−1, where M is a maximum quantity of SSBs 415 that can be carried by an SS burst 410. In some examples, an SSB may be referred to as an SS/PBCH block.

In some aspects, different SSBs 415 may be beam-formed differently (for example, transmitted using different beams), and may be used for cell search, cell acquisition, beam management, and/or beam selection (for example, as part of an initial network access procedure). An SS burst set 405 may be periodically transmitted by a wireless node (for example, a network node 110), such as every X milliseconds, as shown in FIG. 4. In some aspects, an SS burst set 405 may have a fixed or dynamic length, shown as Y milliseconds in FIG. 4. In some examples, an SS burst set 405 or an SS burst 410 may be referred to as a discovery reference signal (DRS) transmission window or an SSB measurement time configuration (SMTC) window.

In some aspects, an SSB 415 may include resources that carry a primary synchronization signal (PSS) 420, a secondary synchronization signal (SSS) 425, and/or a physical broadcast channel (PBCH) 430. In some aspects, multiple SSBs 415 are included in an SS burst 410 (for example, with transmission on different beams), and the PSS 420, the SSS 425, and/or the PBCH 430 may be the same across each SSB 415 of the SS burst 410. In some aspects, a single SSB 415 may be included in an SS burst 410. In some aspects, the SSB 415 may be at least four symbols (for example, OFDM symbols) in length, where each symbol carries one or more of the PSS 420 (for example, occupying one symbol), the SSS 425 (for example, occupying one symbol), and/or the PBCH 430 (for example, occupying two symbols). In some aspects, an SSB 415 may be referred to as an SS/PBCH block.

In some aspects, the symbols of an SSB 415 are consecutive, as shown in FIG. 4. In some aspects, the symbols of an SSB 415 are non-consecutive. Similarly, in some aspects, one or more SSBs 415 of the SS burst 410 may be transmitted in consecutive radio resources (for example, consecutive symbols) during one or more slots. Additionally or alternatively, one or more SSBs 415 of the SS burst 410 may be transmitted in non-consecutive radio resources.

In some aspects, the SS bursts 410 may have a burst period, and the SSBs 415 of the SS burst 410 may be transmitted by a wireless node (for example, a network node 110) according to the burst period. In this case, the SSBs 415 may be repeated during each SS burst 410. In some aspects, the SS burst set 405 may have a burst set periodicity, whereby the SS bursts 410 of the SS burst set 405 are transmitted by the wireless node according to the fixed burst set periodicity. In other words, the SS bursts 410 may be repeated during each SS burst set 405.

In some aspects, an SSB 415 may include an SSB index, which may correspond to a beam used to carry the SSB 415. A UE 120 may monitor for and/or measure SSBs 415 using different Rx beams during an initial network access procedure and/or a cell search procedure, among other examples. Based at least in part on the monitoring and/or measuring, the UE 120 may indicate one or more SSBs 415 with a best signal parameter (for example, a reference signal received power (RSRP) parameter) to a network node 110 (for example, directly or via one or more other network nodes). The network node 110 and the UE 120 may use the one or more indicated SSBs 415 to select one or more beams to be used for communication between the network node 110 and the UE 120 (for example, for a RACH procedure). Additionally or alternatively, the UE 120 may use the SSB 415 and/or the SSB index to identify a cell timing for a cell via which the SSB 415 is received (for example, a serving cell). Some implementations described herein may involve receiving an indication of at least one SSB transmitted in an SS burst, such as an SS burst 410.

FIG. 5 is a diagram illustrating an example 500 of an indication of one or more transmitted SSBs in an SS burst. In some examples, the quantity of transmitted SSBs in an SS burst may be less than the maximum quantity of SSBs that can be carried by the SS burst. For example, in cases where the network node 110 has eight beams that can carry an SSB, one or more of the eight beams may carry SSBs in an SS burst (for example, fewer than eight beams may carry the SSBs).

In some examples, the network node 110 may transmit, and the UE 120 may receive, an indication of one or more transmitted SSBs in an SS burst. For example, the network node 110 may indicate the SSBs that were actually transmitted in the SS burst. The indication of the one or more transmitted SSBs may be an ssb-PositionsInBurst information element (IE) 510. The ssb-PositionsInBurst IE 510 may indicate a bitmap of the transmitted SSBs in an SS burst. In some examples, the ssb-PositionsInBurst IE 510 may be provided in a servingcellConfigCommon parameter or a SIB1, among other examples.

Because the ssb-PositionsInBurst IE 510 indicates the SSBs that are actually transmitted (which may correspond to a subset of all possible SSB beams) and should therefore be mapped to ROs, the ssb-PositionsInBurst IE 510 may impact the SSB-RO mapping. For example, an association period, starting from a frame 0, for mapping SSB indexes to ROs may be the smallest value in a set identified by a PRACH configuration period such that $$N_{Tx}^{SSB}$$

SSB indexes are mapped at least once to the ROs within the association period. The UE 120 may obtain $$N_{Tx}^{SSB}$$

SSBs from the value of the ssb-PositionsInBurst IE 510. If after an integer number of SSB indexes to ROs mapping cycles within the association period there is a set of ROs or PRACH preambles that are not mapped to $$N_{Tx}^{SSB}$$

SSB indexes, no SSB indexes may be mapped to the set of ROs or PRACH preambles. An association pattern period may include one or more association periods and may be identified so that a pattern between ROs and SSB indexes repeats at most every 160 ms. ROs not associated with SSB indexes after an integer quantity of association periods, if any, may not be used for PRACH transmissions. In some examples, an RO may be referred to as a PRACH occasion. Some implementations described herein may involve receiving an ssb-PositionsInBurst IE, such as ssb-PositionsInBurst IE 510, and receiving an indication of at least one transmitted SSB indicated in the ssb-PositionsInBurst IE.

Figure 6:
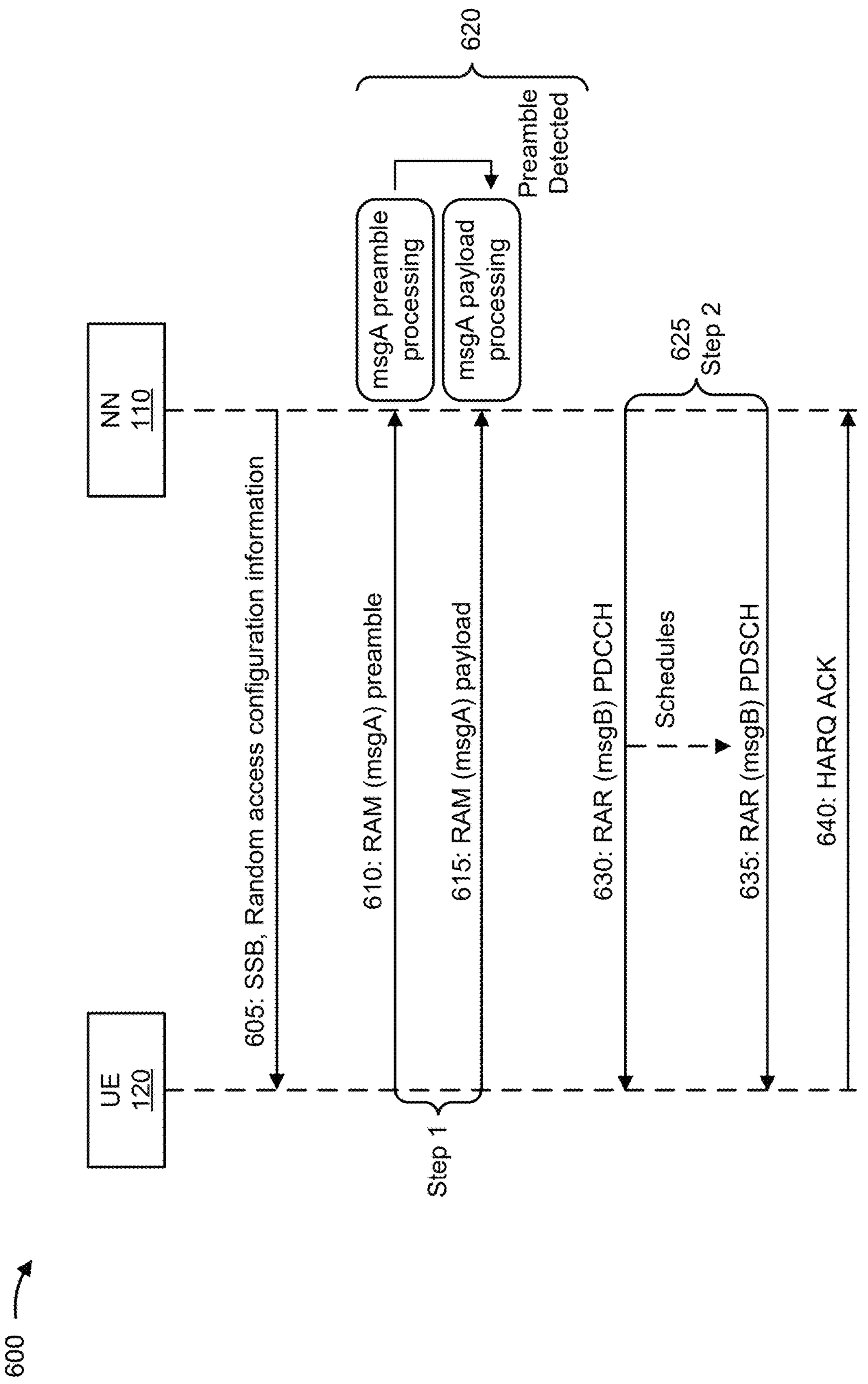
FIG. 6 is a diagram illustrating an example of a two-step random access procedure.

FIG. 6 is a diagram illustrating an example 600 of a two-step random access procedure. As shown in FIG. 6, a network node 110 and a UE 120 may communicate with one another to perform the two-step random access procedure.

In a first operation 605, the network node 110 may transmit, and the UE 120 may receive, one or more SSBs and random access configuration information. In some aspects, the random access configuration information may be transmitted in and/or indicated by system information (for example, in one or more SIBs) and/or an SSB, such as for contention-based random access. Additionally or alternatively, the random access configuration information may be transmitted in an RRC message and/or a physical downlink control channel (PDCCH) order message that triggers a RACH procedure, such as for contention-free random access. The random access configuration information may include one or more parameters to be used in the two-step random access procedure, such as one or more parameters for transmitting a random access message (RAM) and/or receiving a random access response (RAR) to the RAM.

In a second operation 610, the UE 120 may transmit, and the network node 110 may receive, a RAM preamble. In a third operation 615, the UE 120 may transmit, and the network node 110 may receive, a RAM payload. As shown, the UE 120 may transmit the RAM preamble and the RAM payload to the network node 110 as part of an initial (or first) step of the two-step random access procedure. In some aspects, the RAM may be referred to as message A, msgA, a first message, or an initial message in a two-step random access procedure. Furthermore, in some aspects, the RAM preamble may be referred to as a message A preamble, a msgA preamble, a preamble, or a physical random access channel (PRACH) preamble, and the RAM payload may be referred to as a message A payload, a msgA payload, or a payload. In some aspects, the RAM may include some or all of the contents of message 1 (msg1) and message 3 (msg3) of a four-step random access procedure, which is described in more detail below. For example, the RAM preamble may include some or all contents of message 1 (for example, a PRACH preamble), and the RAM payload may include some or all contents of message 3 (for example, a UE identifier, UCI, and/or a PUSCH transmission).

In a fourth operation 620, the network node 110 may receive the RAM preamble transmitted by the UE 120. If the network node 110 successfully receives and decodes the RAM preamble, the network node 110 may then receive and decode the RAM payload.

In a fifth operation 625, the network node 110 may transmit an RAR (sometimes referred to as an RAR message). As shown, the network node 110 may transmit the RAR message as part of a second step of the two-step random access procedure. In some aspects, the RAR message may be referred to as message B, msgB, or a second message in a two-step random access procedure. The RAR message may include some or all of the contents of message 2 (msg2) and message 4 (msg4) of a four-step random access procedure. For example, the RAR message may include the detected PRACH preamble identifier, the detected UE identifier, a timing advance value, and/or contention resolution information.

In a sixth operation 630, as part of the second step of the two-step random access procedure, the network node 110 may transmit a PDCCH communication for the RAR. The PDCCH communication may schedule a physical downlink shared channel (PDSCH) communication that includes the RAR. For example, the PDCCH communication may indicate a resource allocation (for example, in DCI) for the PDSCH communication.

In a seventh operation 635, as part of the second step of the two-step random access procedure, the network node 110 may transmit the PDSCH communication for the RAR, as scheduled by the PDCCH communication. The RAR may be included in a MAC protocol data unit (PDU) of the PDSCH communication. In an eighth operation 640, if the UE 120 successfully receives the RAR, the UE 120 may transmit a hybrid automatic repeat request (HARQ) acknowledgement (ACK). Some implementations described herein may involve transmitting a RACH message, such as a msgA communication.

Figure 7:
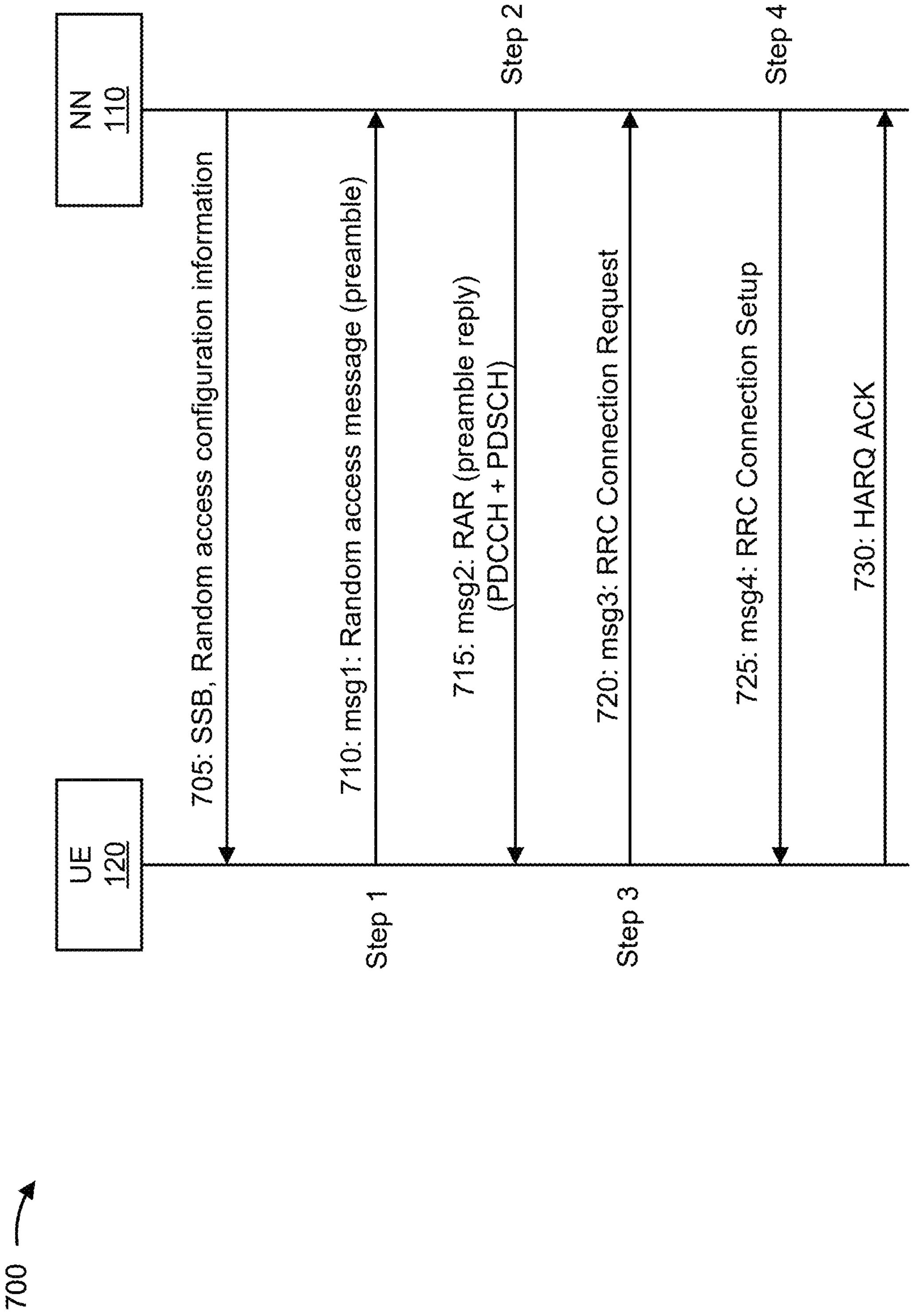
FIG. 7 is a diagram illustrating an example of a four-step random access procedure.

FIG. 7 is a diagram illustrating an example of a four-step random access procedure. As shown in FIG. 7, a network node 110 and a UE 120 may communicate with one another to perform the four-step random access procedure.

In a first operation 705, the network node 110 may transmit, and the UE 120 may receive, one or more SSBs and random access configuration information. In some aspects, the random access configuration information may be transmitted in and/or indicated by system information (for example, in one or more system information blocks (SIBs)) and/or an SSB, such as for contention-based random access. Additionally or alternatively, the random access configuration information may be transmitted in an RRC message and/or a physical downlink control channel (PDCCH) order message that triggers a RACH procedure, such as for contention-free random access. The random access configuration information may include one or more parameters to be used in the random access procedure, such as one or more parameters for transmitting a RAM and/or one or more parameters for receiving an RAR.

In a second operation 710, the UE 120 may transmit a RAM, which may include a preamble (sometimes referred to as a random access preamble, a PRACH preamble, or a RAM preamble). The message that includes the preamble may be referred to as a message 1, msg1, MSG1, a first message, or an initial message in a four-step random access procedure. The random access message may include a random access preamble identifier.

In a third operation 715, the network node 110 may transmit an RAR as a reply to the preamble. The message that includes the RAR may be referred to as message 2, msg2, MSG2, or a second message in a four-step random access procedure. In some aspects, the RAR may indicate the detected random access preamble identifier (for example, received from the UE 120 in msg1). Additionally or alternatively, the RAR may indicate a resource allocation to be used by the UE 120 to transmit message 3 (msg3).

In some aspects, as part of the second step of the four-step random access procedure, the network node 110 may transmit a PDCCH communication for the RAR. The PDCCH communication may schedule a PDSCH communication that includes the RAR. For example, the PDCCH communication may indicate a resource allocation for the PDSCH communication. Also as part of the second step of the four-step random access procedure, the network node 110 may transmit the PDSCH communication for the RAR, as scheduled by the PDCCH communication. The RAR may be included in a MAC PDU of the PDSCH communication.

In a fourth operation 720, the UE 120 may transmit an RRC connection request message. The RRC connection request message may be referred to as message 3, msg3, MSG3, or a third message of a four-step random access procedure. In some aspects, the RRC connection request may include a UE identifier, UCI, and/or a PUSCH communication (for example, an RRC connection request).

In a fifth operation 725, the network node 110 may transmit an RRC connection setup message. The RRC connection setup message may be referred to as message 4, msg4, MSG4, or a fourth message of a four-step random access procedure. In some aspects, the RRC connection setup message may include the detected UE identifier, a timing advance value, and/or contention resolution information. In a sixth operation 730, if the UE 120 successfully receives the RRC connection setup message, the UE 120 may transmit a HARQ ACK. Some implementations described herein may involve transmitting a RACH message, such as a msg1 or a msg3 communication.

Figure 8:
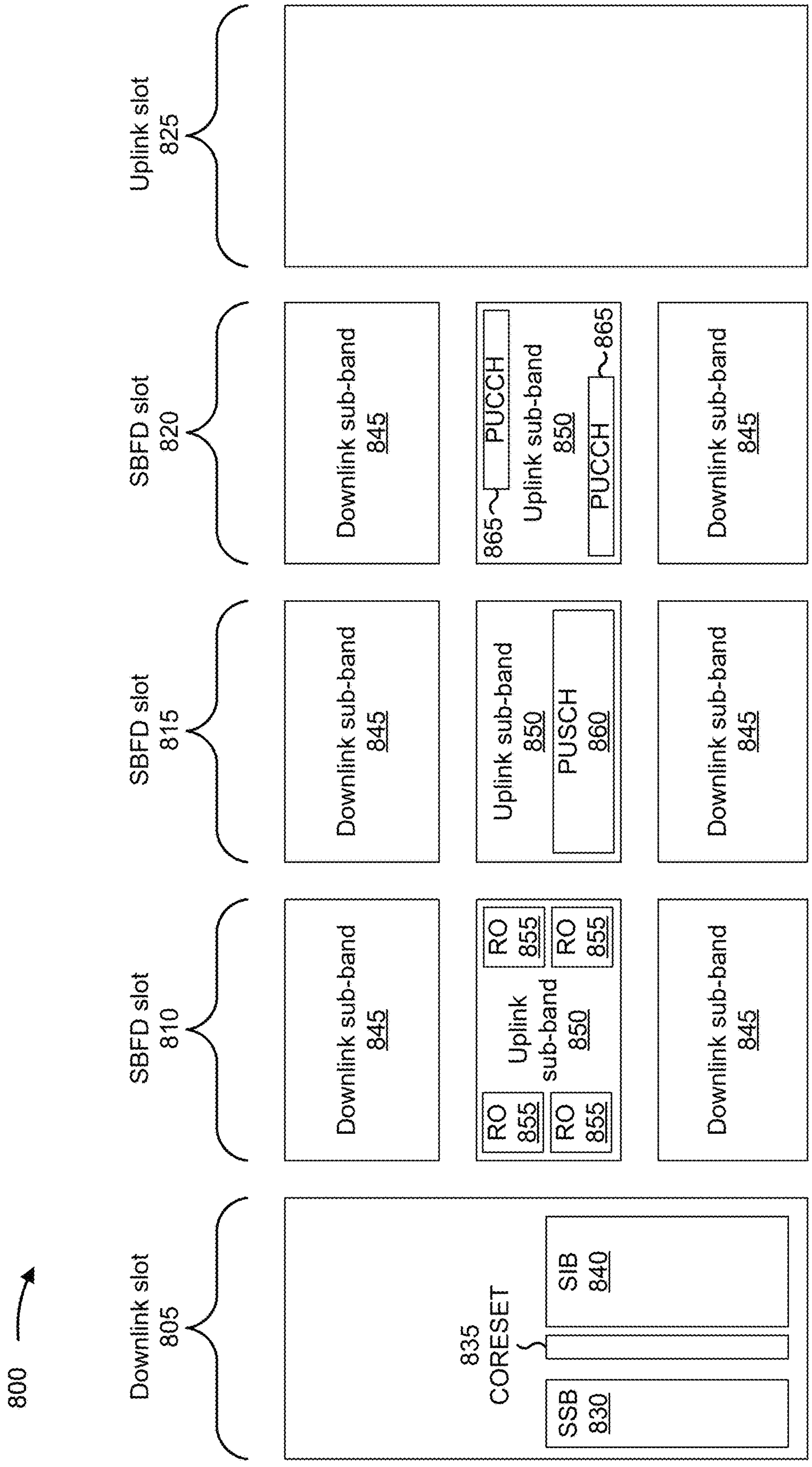
FIG. 8 is a diagram illustrating an example associated with random access in subband full duplex (SBFD) symbols, in accordance with the present disclosure.

FIG. 8 is a diagram illustrating an example 800 associated with random access in SBFD symbols, in accordance with the present disclosure.

Example 800 includes a downlink slot 805, consecutive SBFD slots 810, 815, and 820, and an uplink slot 825. The downlink slot carries an SSB 830, a control resource set (CORESET) communication 835, and a SIB 840. The consecutive SBFD slots 810, 815, and 820 are configured with downlink subbands 845 and uplink subband 850. The uplink subband 850 in the SBFD slot 810 may be configured with a plurality of ROs 855. The uplink subband 850 in the SBFD slot 815 may be configured with a PUSCH occasion 860. The uplink subband 850 in the SBFD slot 815 may be configured with PUCCH occasions 865. The ROs 855, PUSCH occasion 860, and PUCCH occasions 865 may be specific for (for example, configured in) the uplink subband 850.

The ROs 855 may be configured with a RACH configuration. The RACH configuration may be indicated by one or more SIBs, an SSB, an RRC message, or a PDCCH order message that triggers a RACH procedure, among other examples. The RACH configuration may indicate one or more ROs (for example, time domain and frequency domain resource allocations for the ROs 855), a RACH preamble format, a subcarrier spacing, a quantity of cyclic shifts of a sequence of a RACH preamble, or a power configuration, among other examples.

There are at least two solutions for RACH configurations in SBFD networks, such as the RACH configuration that configures the ROs 855. A first solution involves one RACH configuration for slots of all duplex types. For example, a single RACH configuration may apply to downlink slot 805, consecutive SBFD slots 810, 815, and 820, and uplink slot 825. The first solution may further involve defining, for SBFD-aware UEs, validity rules in SBFD slots configured in downlink symbols by a TDD-UL-DL-ConfigCommon parameter (for example, consecutive SBFD slots 810, 815, and 820). A single RACH configuration may result in less system information (SI). However, the first solution may create an SSB-RO mapping ambiguity between non-SBFD-aware UEs and SBFD-aware UEs, which may require further solutions based at least in part on the behavior of SBFD-aware UEs. Furthermore, when an uplink subband is configured in the middle of two downlink subbands (for example, the uplink subband 850), the PRACH frequency resource may cause resource fragmentation in uplink slots (for example, uplink slot 825).

A second solution for RACH configurations in SBFD networks involves separate RACH configurations for each duplex type (for example, time division duplex (TDD) and SBFD). For example, the second solution may involve a first RACH configuration dedicated for TDD and a second RACH configuration dedicated for SBFD-aware UEs. Because the RACH configurations are independent, the second solution may avoid SSB-RO mapping problems. Moreover, the RACH configurations may have respective parameters, thereby improving optimization. However, the second solution may require additional RACH configurations and/or overhead. Furthermore, validity rules may need to be defined differently for the second RACH configuration dedicated for SBFD-aware UEs.

In some examples, an SBFD operation may occur at the network node 110 within a TDD carrier. The SBFD operation may support random access (for example, a two-step random access procedure or a four-step random access procedure) in SBFD symbols by SBFD-aware UEs in RRC connected mode, RRC idle mode, and/or RRC inactive mode. For example, a random access procedure may be triggered while a UE 120 is in an RRC connected mode due to handover, beam failure, or a PDCCH-ordered RACH (for example, uplink timing update), among other examples. Random access may be allowed in SBFD symbols for at least PRACH and msg3 transmissions in symbols configured as downlink in a TDD-UL-DL-ConfigCommon parameter.

Allowing random access in SBFD symbols for SBFD-aware UEs may provide several advantages. In some examples, allowing random access in SBFD symbols may reduce random access latency, such as reducing latency for random access procedures and/or for initial access procedures or handovers (for example, in cases where layer 1 or layer 2 mobility is adopted). In some examples, allowing random access in SBFD symbols may enable additional ROs within an uplink subband 850, thereby reducing RACH (for example, PRACH) collision probability, improving RACH capacity, and reducing the contention-based collisions probability while enabling more UEs 120 to access a network. In some examples, allowing random access in SBFD symbols may improve or enhance the uplink coverage of PRACH and msg3 for initial access. For example, a UE 120 may use the uplink subband 850 in consecutive SBFD slots 810, 815, and 820 to enable PRACH or msg1 repetition, msg3 repetition, and/or frequency hopping. Some implementations described herein may involve transmitting a RACH message in an RO configured in one or more SBFD symbols, such as ROs 855.

Figure 9:
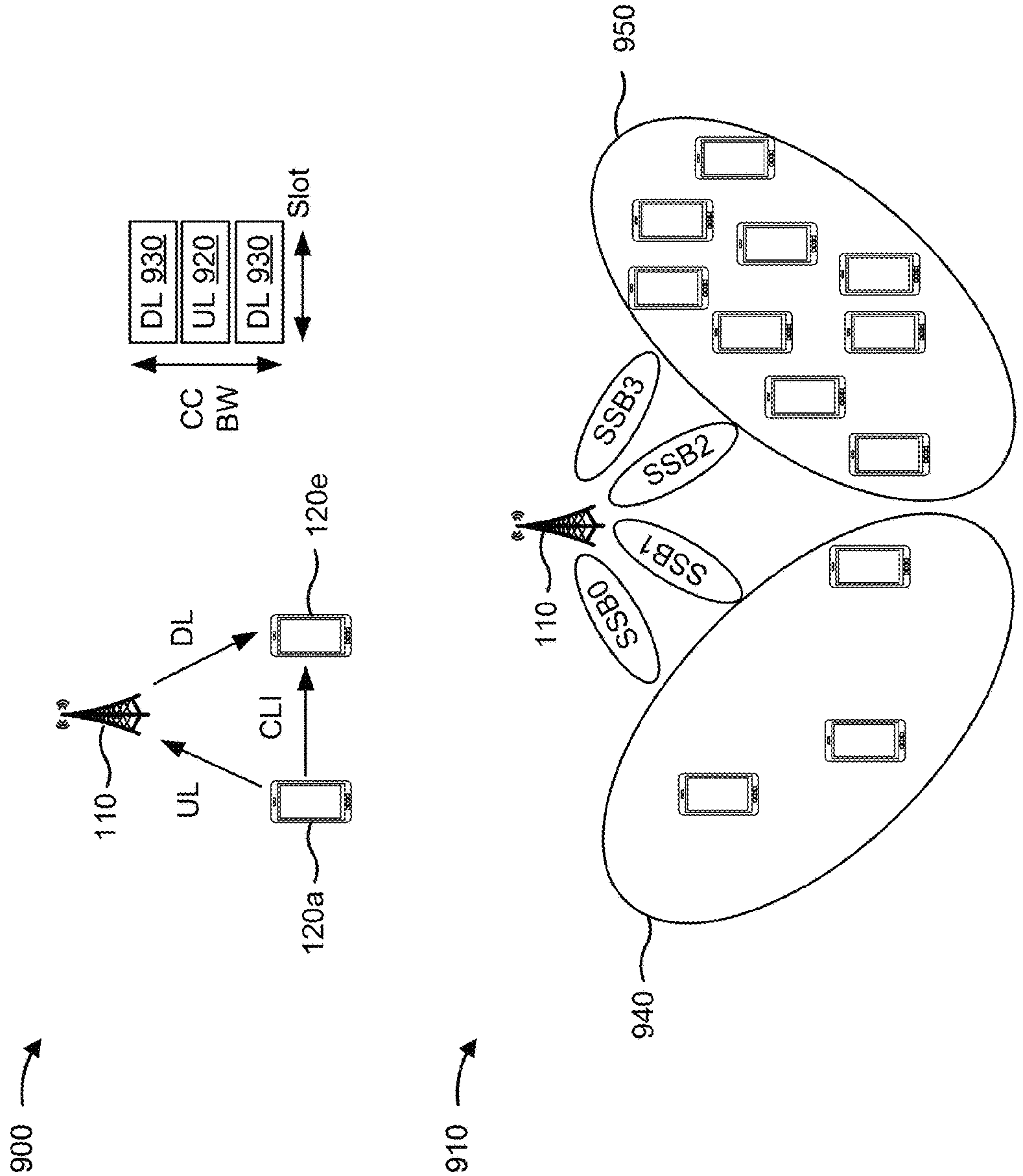
FIG. 9 is a diagram illustrating examples of UE-to-UE cross-link interference (CLI).

FIG. 9 is a diagram illustrating examples 900 and 910 of UE-to-UE cross-link interference (CLI).

In example 900, a network node 110 may communicate with UE 120*a* and UE 120*e*. The network node 110 may be a full-duplex network node, and UEs 120*a* and 120*e* may be half-duplex UEs. In some examples, the UE 120*a* and the UE 120*e* may be configured with an SBFD configuration that includes uplink subband 920 and downlink subbands 930. The uplink subband 920 and the downlink subbands 930 may be arranged, in the same slot, within a component carrier (CC) bandwidth in a non-overlapping manner in the frequency domain. As shown, the network node 110 may simultaneously receive an uplink transmission ("UL") from the UE 120*a* and transmit a downlink transmission ("DL") to the UE 120*e*. For example, the UE 120*a* may transmit the uplink transmission on the uplink subband 920, and the UE 120*e* may receive the downlink transmission on one or more of the downlink subbands 930. As a result, the UE 120*e* may be subjected to UE-to-UE CLI from the UE 120*a*. For example, the uplink transmission may be a PRACH transmission and/or a msg3 transmission in an uplink subband in an SBFD symbol that causes the UE-to-UE CLI.

In example 910, the network node 110 transmits SSB0-SSB3 over respective beams. As shown, a first geographical area 940 in the direction of the beams corresponding to SSB0 and SSB1 is sparsely populated with UEs, and a second geographical area 950 in the direction of the beams corresponding to SSB2 and SSB3 is densely populated with UEs. As a result, a UE that transmits a RACH message in an SBFD slot in the first geographical area 940 may generate little or no UE-to-UE CLI among the UEs in the first geographical area 940, whereas a UE that transmits a RACH message in an SBFD slot in the second geographical area 950 may generate severe UE-to-UE CLI among the UEs in the second geographical area 950. Accordingly, some implementations described herein may involve restricting SBFD RACH in densely populated geographical areas, such as the second geographical area 950.

Figure 10:
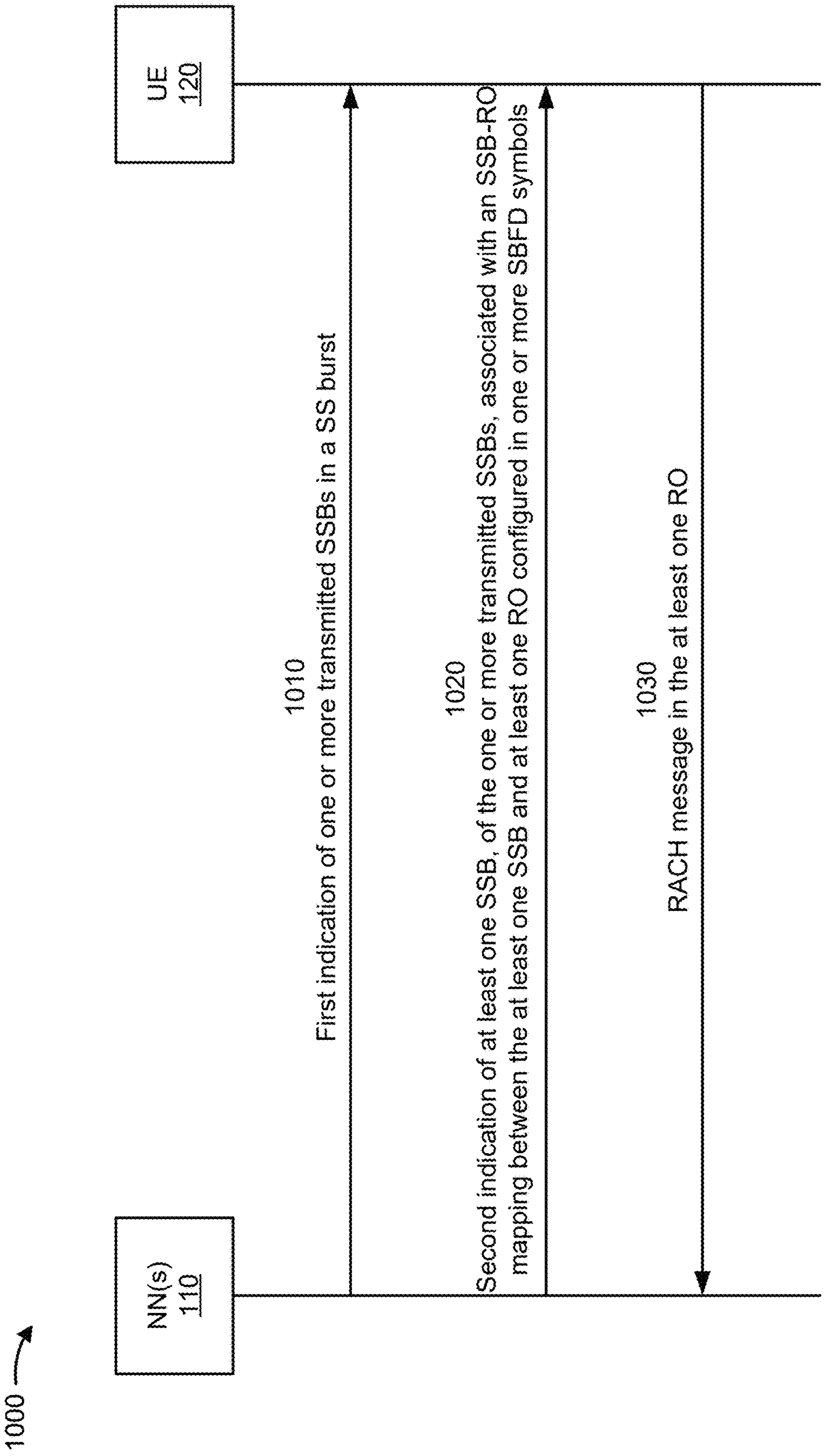
FIG. 10 is a diagram illustrating an example associated with beam-based restriction of an SBFD random access channel (RACH).

FIG. 10 is a diagram illustrating an example 1000 associated with beam-based restriction of SBFD RACH. As shown in FIG. 10, a network node 110 and a UE 120 may communicate with one another. In some examples, the UE 120 may be SBFD-aware.

In a first operation 1010, the network node 110 may transmit, and the UE 120 may receive, a first indication of one or more transmitted SSBs in a SS burst. For example, the first indication may indicate the SSBs that were actually transmitted in the SS burst. For example, the transmitted SSBs may be a subset of all SSBs that could be transmitted in the SS burst. In some examples, the first indication of the one or more transmitted SSBs may be an ssb-PositionsInBurst IE.

In a second operation 1020, the network node 110 may transmit, and the UE 120 may receive, a second indication of at least one SSB, of the one or more transmitted SSBs, associated with an SSB-RO mapping. The at least one SSB may be associated with the SSB-RO mapping in that the SSB-RO mapping may map the at least one SSB to an RO. In some examples, the SSB-RO mapping may be between the at least one SSB and at least one RO configured in one or more SBFD symbols. For example, the at least one SSB may be mapped to the at least one RO that is configured in one or more SBFD symbols. In some examples, the second indication may indicate whether the UE 120 is allowed to use a beam corresponding to the at least one SSB for SBFD RACH by transmitting a RACH message in the at least one RO that is mapped to the at least one SSB.

In some aspects, the second indication may comprise a bitmap that includes one or more bits indicating the at least one SSB that is associated with the SSB-RO mapping. The bitmap may correspond to the valid SSBs that the UE 120 can use for SBFD RACH. For example, if the at least one SSB corresponds to a bit having a value of 1, then the UE 120 may be allowed to use the beam corresponding to the SSB for SBFD RACH. If the at least one SSB corresponds to a bit having a value of 0, then the UE 120 may not be allowed to use the beam corresponding to the SSB for SBFD RACH. Thus, the bitmap may be an SSB bitmap restricting SBFD operation, such as SBFD RACH. In some examples, the network node 110 may indicate the bitmap in a servingcellConfigCommon parameter or a SIB1.

In a third operation 1030, the UE 120 may transmit, and the network node 110 may receive, in accordance with the second indication, a RACH message in the at least one RO. For example, the second indication may indicate that the UE 120 is allowed to use the beam corresponding to the at least one SSB for SBFD RACH, and the UE 120 may transmit the RACH message in the at least one RO based at least in part on the second indication. The RACH message may be any suitable uplink communication that is transmitted during a RACH procedure, such as a msgA, msg1, or msg3, among other examples.

Figure 11:
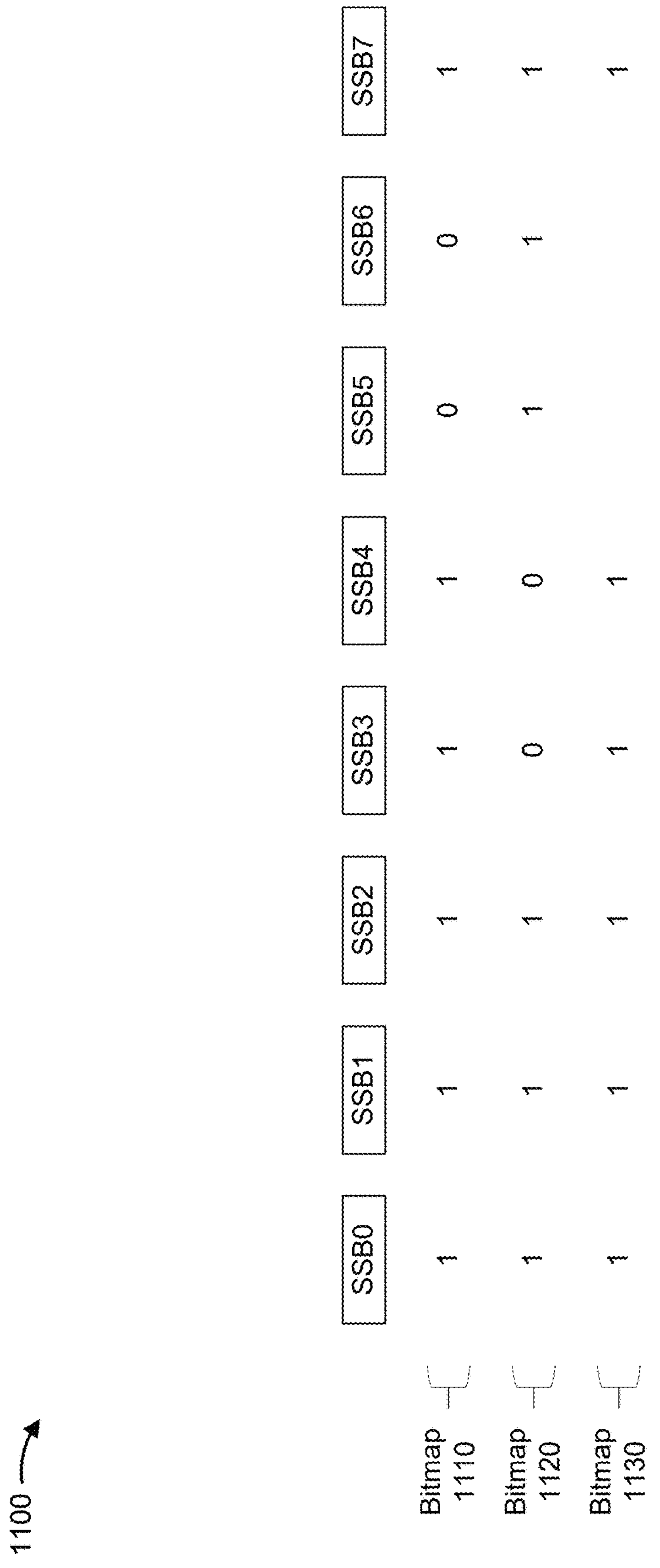
FIG. 11 is a diagram illustrating an example associated with SSB bitmaps.

FIG. 11 is a diagram illustrating an example 1100 associated with SSB bitmaps.

Example 1100 shows three bitmaps 1110, 1120, and 1130, each containing bits that map to one or more of SSB0-SSB7. SSB0-SSB7 may be SSBs that could be transmitted in an SS burst. In some examples, the first indication may comprise the bitmap 1110. For example, the bitmap 1110 may be a bitmap of the one or more transmitted SSBs in an SS burst. In some examples, the second indication may comprise bitmap 1120 or bitmap 1130. For example, bitmaps 1120 and 1130 may include one or more bits indicating the at least one SSB that is associated with the SSB-RO mapping.

In some examples, bits having a value of 1 in the bitmap 1110 may map to transmitted SSBs, and bits having a value of 0 in the bitmap 1110 may map to SSBs that were not transmitted. For example, bitmap 1110 may indicate that SSB0-SSB4 and SSB7 are transmitted SSBs, and that SSB5 and SSB6 were not transmitted. In some examples, the bitmap 1110 may be an ssb-PositionsInBurst IE.

In some aspects, bitmap 1110 and bitmap 1120 may have equal bit lengths. For example, bitmap 1110 and bitmap 1120 may each contain 8 bits corresponding to SSB0-SSB7. Because transmitted SSB0-SSB2 and SSB7 correspond to bits in bitmap 1120 having a value of 1, the UE 120 may be allowed to use the beams corresponding to SSB0-SSB2 and SSB7 for SBFD RACH. Because SSB3 and SSB4 correspond to a bit having a value of 0, the UE 120 may not be allowed to use the beams corresponding to SSB3 or SSB4 for SBFD RACH. For example, the SSB3 and SSB4 may not be accessible for SBFD RACH. In some examples, the UE 120 may ignore the bits in bitmap 1120 corresponding to the SSBs that are not transmitted. For example, the UE 120 may ignore the bits in bitmap 1120 corresponding to SSB5 and SSB6 (regardless of the value of those bits) because the bits in bitmap 1110 corresponding to SSB5 and SSB6 are 0.

In some aspects, the bitmap 1130 may have a bit length equal to a total quantity of the one or more transmitted SSBs. For example, because bitmap 1110 contains 6 bits having a value of 1, the total quantity of the one or more transmitted SSBs (for example, SSB0-SSB4 and SSB7) may be 6. Thus, the bitmap 1130 may have a bit length equal to a total quantity of bits having a value of 1 in bitmap 1110. Because transmitted SSB0-SSB4 and SSB7 correspond to bits in bitmap 1120 having a value of 1, the UE 120 may be allowed to use the beams corresponding to SSB0-SSB4 and SSB7 for SBFD RACH.

Figure 12:
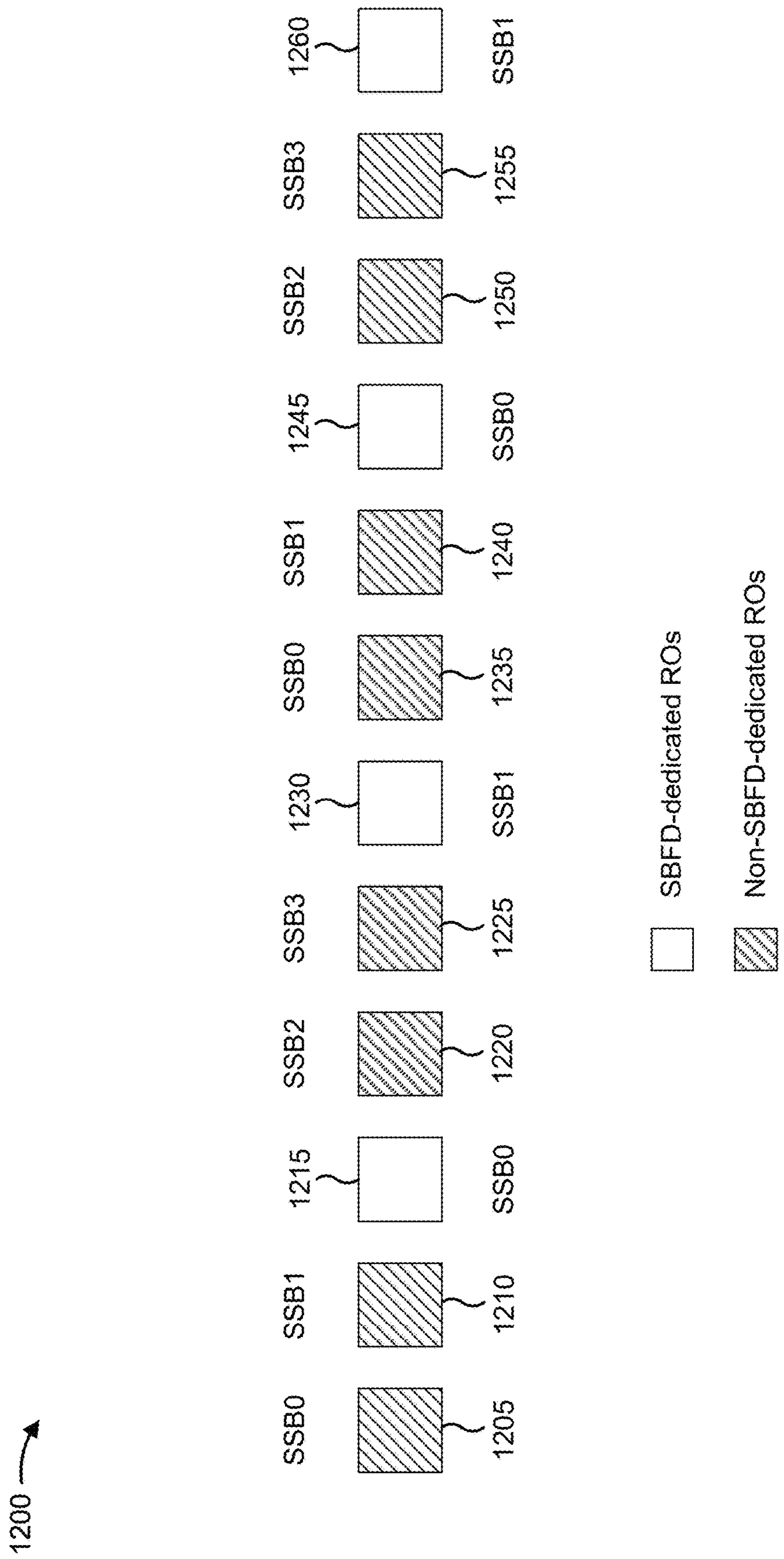
FIG. 12 is a diagram illustrating an example associated with SSB-RACH-occasion (SSB-RO) mapping involving separate RACH configurations.

FIG. 12 is a diagram illustrating an example 1200 associated with SSB-RO mapping involving separate RACH configurations.

Example 1200 shows a plurality of ROs 1205-1260 mapped to SSB0-SSB3. Non-SBFD-dedicated ROs 1205, 1210, 1220, 1225, 1235, 1240, 1250, and 1255 may be configured in half-duplex slots, and SBFD-dedicated ROs 1215, 1230, 1245, and 1260 may be configured in half-duplex slots or SBFD slots. In some examples, ROs 1205-1260 may be configured with separate RACH configurations, such as a first RACH configuration for SBFD-aware UEs (for example, an SBFD-dedicated PRACH configuration) and a second RACH configuration for non-SBFD-aware UEs. SSB0 and SSB1 may be allowed for SBFD RACH, and SSB2 and SSB3 may not be allowed for SBFD RACH. As shown, ROs 1205, 1215, 1235, and 1245 may be mapped to SSB0; ROs 1210, 1230, 1240, and 1260 may be mapped to SSB1; ROs 1220 and 1250 may be mapped to SSB2; and ROs 1225 and 1255 may be mapped to SSB3.

In some aspects, the second indication may be associated with ROs configured in SBFD slots and ROs configured in half-duplex slots. The second indication may be associated with an RO in that the second indication may indicate a transmitted SSB mapped to the RO. For example, the second indication may apply to all SBFD-dedicated ROs 1215, 1230, 1245, and 1260 (for example, SBFD-dedicated ROs configured in SBFD slots and SBFD-dedicated ROs configured in half-duplex slots). For example, the SSB-RO mapping may include a mapping of SSBs that are allowed for SBFD RACH (for example, SSB0 and SSB1) to the SBFD-dedicated ROs 1215, 1230, 1245, and 1260. For example, only SSBs that are allowed for SBFD RACH may be mapped to SBFD-dedicated PRACH.

In some aspects, the second indication may be specific to ROs configured in SBFD slots. For example, the second indication may apply to only SBFD-dedicated ROs configured in SBFD slots. For example, the SSB-RO mapping may depend on the slot type in which the SBFD-dedicated ROs 1215, 1230, 1245, and 1260 are configured. For example, SBFD-dedicated ROs configured in SBFD slots may be mapped only to the SSBs that are allowed for SBFD RACH (for example, SSB0 and SSB1), and SBFD-dedicated ROs configured in half-duplex slots may be mapped to all transmitted SSBs (for example, SSB0-SSB3).

Figure 13:
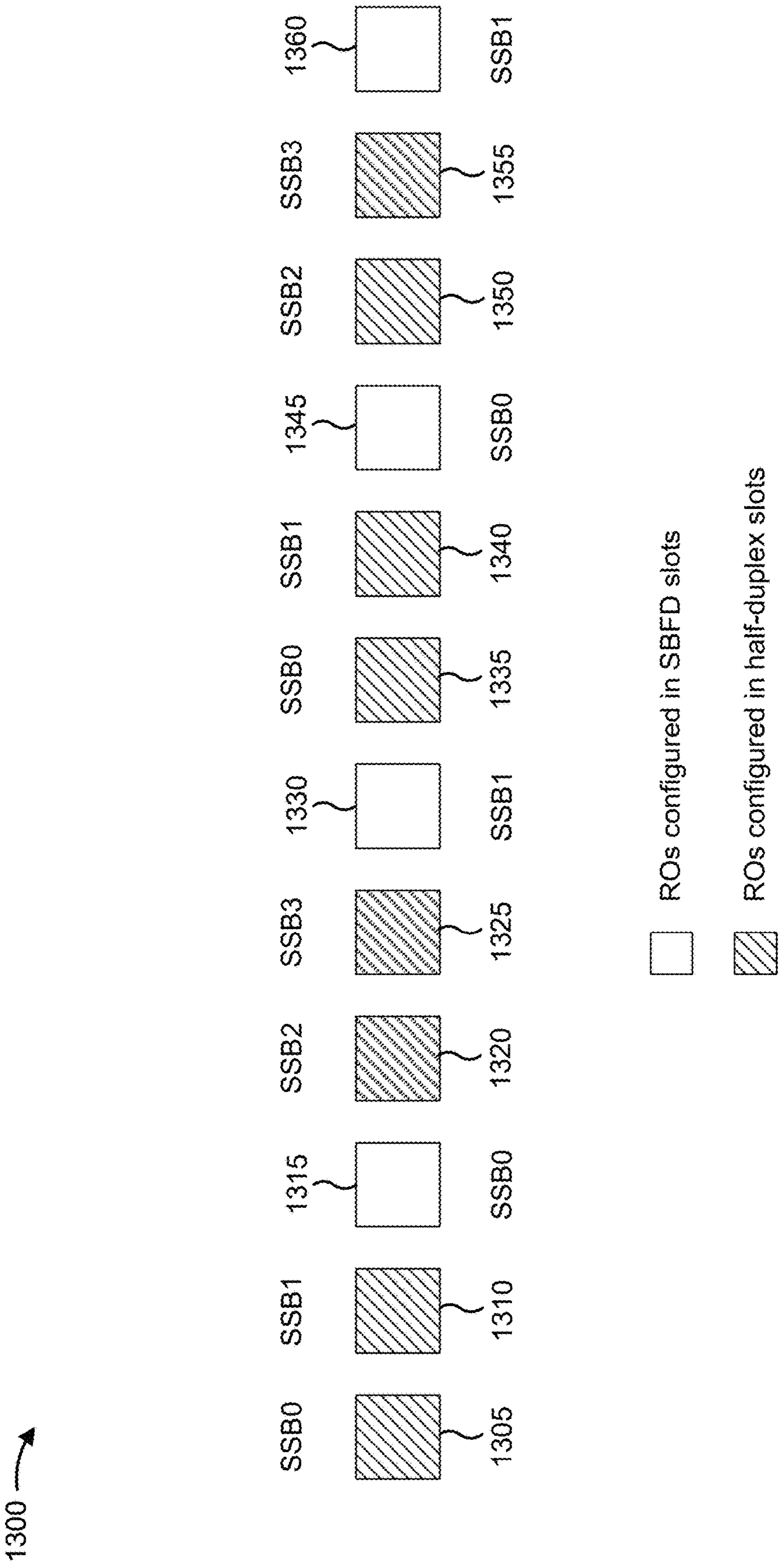
FIG. 13 is a diagram illustrating an example associated with SSB-RO mapping involving a single RACH configuration.

FIG. 13 is a diagram illustrating an example 1300 associated with SSB-RO mapping involving a single RACH configuration. Example 1300 shows a plurality of ROs 1305-1360 mapped to SSB0-SSB3. ROs 1305, 1310, 1320, 1325, 1335, 1340, 1350, and 1355 may be configured in half-duplex slots, and ROs 1315, 1330, 1345, and 1360 may be configured in SBFD slots. SSB0-SSB3 may be transmitted SSBs, and the UE 120 may be allowed to use the beams corresponding to SSB0 and SSB1 for SBFD RACH.

In some aspects, the SSB-RO mapping may be associated with a single RACH configuration, such as a single PRACH configuration, and the SSB-RO mapping may be between transmitted SSBs and ROs 1305, 1310, 1320, 1325, 1335, 1340, 1350, and 1355 configured in half-duplex slots. The SSB-RO mapping may be associated with the single RACH configuration in that one or more of ROs 1305-1360 that are included in the SSB-RO mapping may be configured with the single RACH configuration. In some examples, the UE 120 may perform the SSB-RO mapping in a first stage by mapping SSB0-SSB4 to ROs 1305, 1310, 1320, 1325, 1335, 1340, 1350, and 1355 configured in half-duplex slots. For example, the UE 120 may map SSB0 to RO 1305, SSB1 to RO 1310, SSB2 to RO 1320, SSB3 to RO 1325, SSB0 to RO 1335, SSB1 to RO 1340, SSB2 to RO 1350, and SSB3 to RO 1355.

In some examples, the SSB-RO mapping may be further between the SSBs allowed for SBFD RACH (for example, SSB0 and SSB1) and ROs 1315, 1330, 1345, and 1360 configured in SBFD slots. For example, the UE 120 may perform the SSB-RO mapping in a second stage by mapping SSB0 and SSB1 to ROs 1315, 1330, 1345, and 1360 configured in SBFD slots. For example, the UE 120 may map SSB0 to RO 1315, SSB1 to RO 1330, SSB0 to RO 1345, and SSB1 to RO 1360. For example, the UE 120 may perform the SSB-RO mapping in a second stage by mapping only the SSBs allowed for SBFD RACH (for example, SSB0 and SSB1) to the remaining ROs that are valid only for the UE 120 (for example, the ROs 1315, 1330, 1345, and 1360 configured in SBFD slots).

Receiving the second indication of the at least one SSB, of the one or more transmitted SSBs, associated with the SSB-RO mapping between the at least one SSB and the at least one RO configured in the one or more SBFD symbols may help to reduce UE-to-UE CLI during the one or more SBFD symbols. For example, the second indication may help to restrict SBFD RACH signaling to certain spatial directions corresponding to specific beams.

The bitmap comprising the first indication and the bitmap comprising the second indication having equal bit lengths may enable the UE 120 to decode the bitmap comprising the second indication in cases where the UE 120 has not identified the length of the bitmap comprising the first indication before decoding the bitmap comprising the second indication (for example, in cases where the bitmaps are transmitted together).

The bitmap comprising the second indication having a bit length equal to a total quantity of the one or more transmitted SSBs may help to reduce overhead. For example, the bitmap may avoid carrying bits corresponding to SSBs that were not transmitted.

The second indication being associated with ROs configured in SBFD slots and ROs configured in half-duplex slots may help to reduce complexity, for example, by avoiding distinguishing between ROs configured in SBFD slots and ROs configured in half-duplex slots for purposes of the SBFD RACH restriction.

The second indication being specific to ROs configured in SBFD slots may help to increase efficiency of RO usage. For example, the SBFD RACH restriction may not apply to ROs in half-duplex slots, which may not contribute to UE-to-UE CLI triggered by SBFD.

Figure 14:
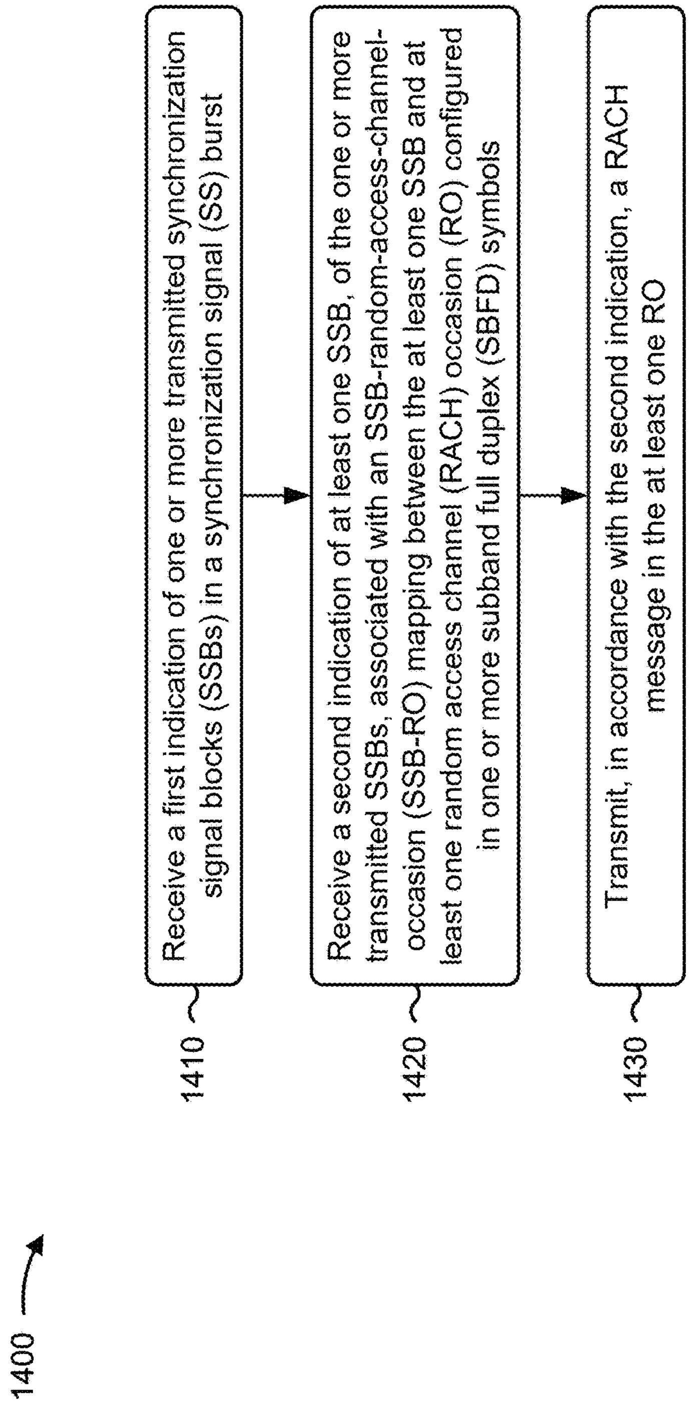
FIG. 14 is a flowchart illustrating an example process performed, for example, at a UE or an apparatus of a UE that supports SSBs for SBFD.

FIG. 14 is a flowchart illustrating an example process 1400 performed, for example, at a UE or an apparatus of a UE that supports SSBs for SBFD. Example process 1400 is an example where the apparatus or the UE (for example, UE 120) performs operations associated with SSBs for SBFD.

As shown in FIG. 14, in some aspects, process 1400 may include receiving a first indication of one or more transmitted SSBs in an SS burst (block 1410). For example, the UE (such as by using communication manager 140 or reception component 1602, depicted in FIG. 16) may receive a first indication of one or more transmitted SSBs in an SS burst, as described above.

As further shown in FIG. 14, in some aspects, process 1400 may include receiving a second indication of at least one SSB, of the one or more transmitted SSBs, associated with an SSB-RO mapping between the at least one SSB and at least one RO configured in one or more SBFD symbols (block 1420). For example, the UE (such as by using communication manager 140 or reception component 1602, depicted in FIG. 16) may receive a second indication of at least one SSB, of the one or more transmitted SSBs, associated with an SSB-RO mapping between the at least one SSB and at least one RO configured in one or more SBFD symbols, as described above.

As further shown in FIG. 14, in some aspects, process 1400 may include transmitting, in accordance with the second indication, a RACH message in the at least one RO (block 1430). For example, the UE (such as by using communication manager 140 or transmission component 1604, depicted in FIG. 16) may transmit, in accordance with the second indication, a RACH message in the at least one RO, as described above.

Process 1400 may include additional aspects, such as any single aspect or any combination of aspects described below or in connection with one or more other processes described elsewhere herein.

In a first additional aspect, the second indication comprises a bitmap that includes one or more bits indicating the at least one SSB that is associated with the SSB-RO mapping.

In a second additional aspect, alone or in combination with the first aspect, the first indication comprises another bitmap, and the bitmap and the other bitmap have equal bit lengths.

In a third additional aspect, alone or in combination with one or more of the first and second aspects, the bitmap has a bit length equal to a total quantity of the one or more transmitted SSBs.

In a fourth additional aspect, alone or in combination with one or more of the first through third aspects, the second indication is associated with ROs configured in SBFD slots and ROs configured in half-duplex slots.

In a fifth additional aspect, alone or in combination with one or more of the first through fourth aspects, the second indication is specific to ROs configured in SBFD slots.

In a sixth additional aspect, alone or in combination with one or more of the first through fifth aspects, the SSB-RO mapping is associated with a single RACH configuration, and the SSB-RO mapping is further between the one or more transmitted SSBs and one or more ROs configured in half-duplex slots.

Although FIG. 14 shows example blocks of process 1400, in some aspects, process 1400 may include additional blocks, fewer blocks, different blocks, or differently arranged blocks than those depicted in FIG. 14. Additionally or alternatively, two or more of the blocks of process 1400 may be performed in parallel.

Figure 15:
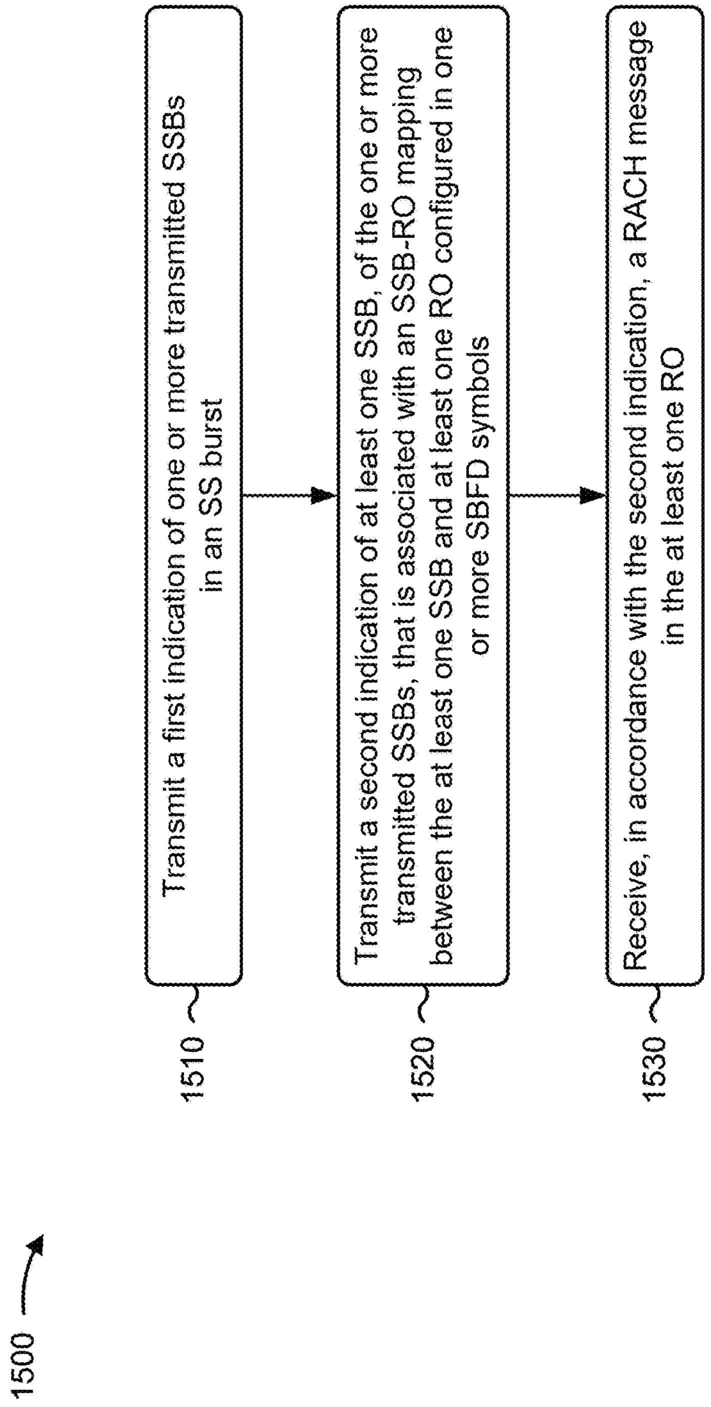
FIG. 15 is a flowchart illustrating an example process performed, for example, at a network node or an apparatus of a network node that supports SSBs for SBFD.

FIG. 15 is a flowchart illustrating an example process 1500 performed, for example, at a network node or an apparatus of a network node that supports SSBs for SBFD. Example process 1500 is an example where the apparatus or the network node (for example, network node 110) performs operations associated with SSBs for SBFD.

As shown in FIG. 15, in some aspects, process 1500 may include transmitting a first indication of one or more transmitted SSBs in an SS burst (block 1510). For example, the network node (such as by using communication manager 150 or transmission component 1704, depicted in FIG. 17) may transmit a first indication of one or more transmitted SSBs in an SS burst, as described above.

As further shown in FIG. 15, in some aspects, process 1500 may include transmitting a second indication of at least one SSB, of the one or more transmitted SSBs, that is associated with an SSB-RO mapping between the at least one SSB and at least one RO configured in one or more SBFD symbols (block 1520). For example, the network node (such as by using communication manager 150 or transmission component 1704, depicted in FIG. 17) may transmit a second indication of at least one SSB, of the one or more transmitted SSBs, that is associated with an SSB-RO mapping between the at least one SSB and at least one RO configured in one or more SBFD symbols, as described above.

As further shown in FIG. 15, in some aspects, process 1500 may include receiving, in accordance with the second indication, a RACH message in the at least one RO (block 1530). For example, the network node (such as by using communication manager 150 or reception component 1702, depicted in FIG. 17) may receive, in accordance with the second indication, a RACH message in the at least one RO, as described above.

Process 1500 may include additional aspects, such as any single aspect or any combination of aspects described below or in connection with one or more other processes described elsewhere herein.

In a first additional aspect, the second indication comprises a bitmap that includes one or more bits indicating the at least one SSB that is associated with the SSB-RO mapping.

In a second additional aspect, alone or in combination with the first aspect, the first indication comprises another bitmap, and the bitmap and the other bitmap have equal bit lengths.

In a third additional aspect, alone or in combination with one or more of the first and second aspects, the bitmap has a bit length equal to a total quantity of the one or more transmitted SSBs.

In a fourth additional aspect, alone or in combination with one or more of the first through third aspects, the second indication is associated with ROs configured in SBFD slots and ROs configured in half-duplex slots.

In a fifth additional aspect, alone or in combination with one or more of the first through fourth aspects, the second indication is specific to ROs configured in SBFD slots.

In a sixth additional aspect, alone or in combination with one or more of the first through fifth aspects, the SSB-RO mapping is associated with a single RACH configuration, and the SSB-RO mapping is further between the one or more transmitted SSBs and one or more ROs configured in half-duplex slots.

Although FIG. 15 shows example blocks of process 1500, in some aspects, process 1500 may include additional blocks, fewer blocks, different blocks, or differently arranged blocks than those depicted in FIG. 15. Additionally or alternatively, two or more of the blocks of process 1500 may be performed in parallel.

Figure 16:
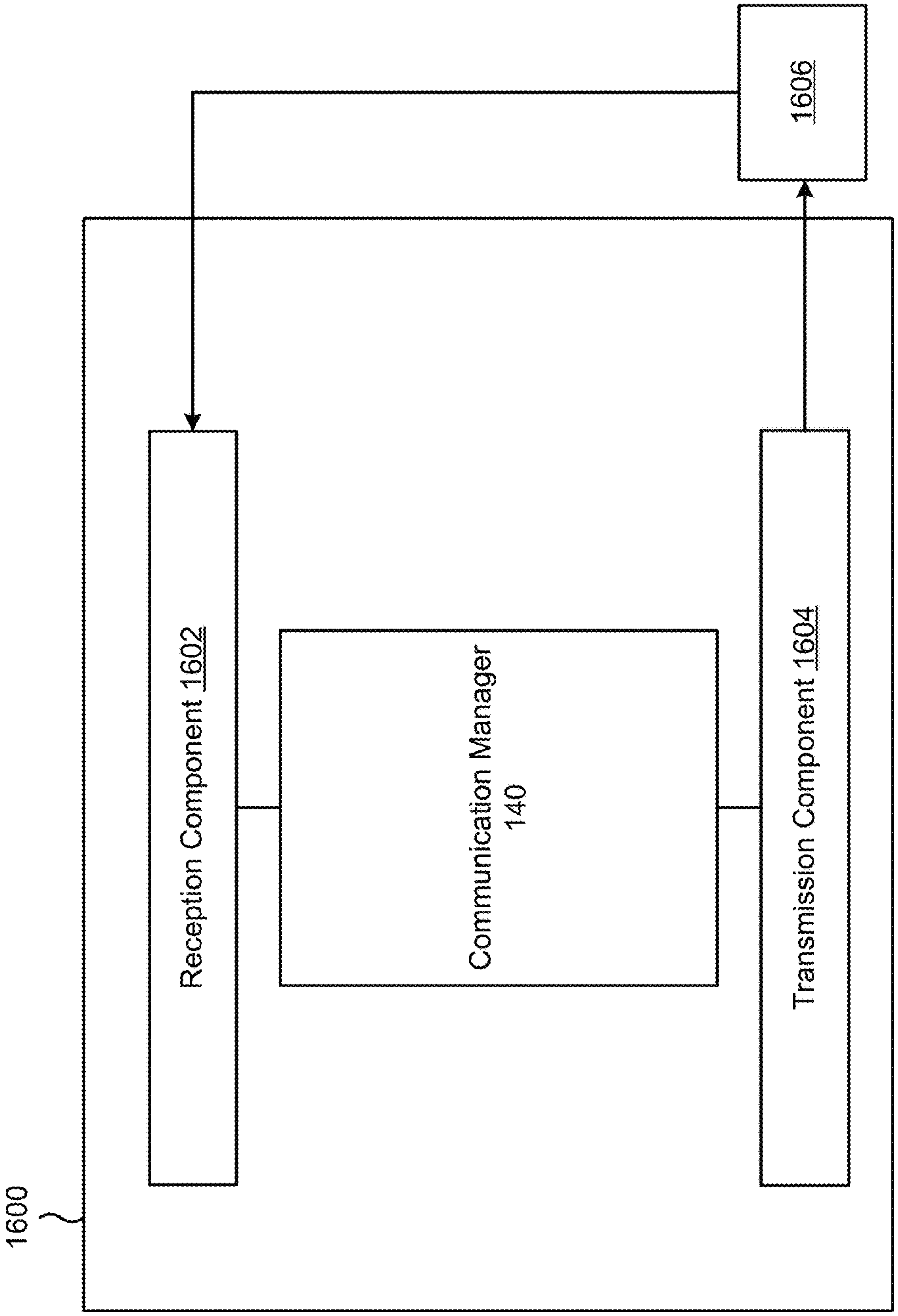
FIG. 16 is a diagram of an example apparatus, such as a UE, for wireless communication that supports SSBs for SBFD.

FIG. 16 is a diagram of an example apparatus 1600 for wireless communication that supports SSBs for SBFD. The apparatus 1600 may be a UE, or a UE may include the apparatus 1600. In some aspects, the apparatus 1600 includes a reception component 1602, a transmission component 1604, and a communication manager 140, which may be in communication with one another (for example, via one or more buses). As shown, the apparatus 1600 may communicate with another apparatus 1606 (such as a UE, a network node, or another wireless communication device) using the reception component 1602 and the transmission component 1604.

In some aspects, the apparatus 1600 may be configured to and/or operable to perform one or more operations described herein in connection with FIGS. 10-13. Additionally or alternatively, the apparatus 1600 may be configured to and/or operable to perform one or more processes described herein, such as process 1400 of FIG. 14. In some aspects, the apparatus 1600 may include one or more components of the UE described above in connection with FIG. 2.

The reception component 1602 may receive communications, such as reference signals, control information, and/or data communications, from the apparatus 1606. The reception component 1602 may provide received communications to one or more other components of the apparatus 1600, such as the communication manager 140. In some aspects, the reception component 1602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1602 may include one or more antennas, one or more modems, one or more demodulators, one or more MIMO detectors, one or more receive processors, one or more controllers/processors, and/or one or more memories of the UE described above in connection with FIG. 2.

The transmission component 1604 may transmit communications, such as reference signals, control information, and/or data communications, to the apparatus 1606. In some aspects, the communication manager 140 may generate communications and may transmit the generated communications to the transmission component 1604 for transmission to the apparatus 1606. In some aspects, the transmission component 1604 may perform signal processing on the generated communications (such as filtering, amplification, modulation, digital-to-analog conversion, multiplexing, interleaving, mapping, or encoding, among other examples), and may transmit the processed signals to the apparatus 1606. In some aspects, the transmission component 1604 may include one or more antennas, one or more modems, one or more modulators, one or more transmit MIMO processors, one or more transmit processors, one or more controllers/processors, and/or one or more memories of the UE described above in connection with FIG. 2. In some aspects, the transmission component 1604 may be co-located with the reception component 1602 in one or more transceivers.

The communication manager 140 may receive or may cause the reception component 1602 to receive a first indication of one or more transmitted SSBs in an SS burst. The communication manager 140 may receive or may cause the reception component 1602 to receive a second indication of at least one SSB, of the one or more transmitted SSBs, associated with an SSB-RO mapping between the at least one SSB and at least one RO configured in one or more SBFD symbols. The communication manager 140 may transmit or may cause the transmission component 1604 to transmit, in accordance with the second indication, a RACH message in the at least one RO. In some aspects, the communication manager 140 may perform one or more operations described elsewhere herein as being performed by one or more components of the communication manager 140. The communication manager 140 may include one or more controllers/processors and/or one or more memories of the UE described above in connection with FIG. 2.

The reception component 1602 may receive a first indication of one or more transmitted SSBs in an SS burst. The reception component 1602 may receive a second indication of at least one SSB, of the one or more transmitted SSBs, associated with an SSB-RO mapping between the at least one SSB and at least one RO configured in one or more SBFD symbols. The transmission component 1604 may transmit, in accordance with the second indication, a RACH message in the at least one RO.

The number and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally or alternatively, a set of (one or more) components shown in FIG. 16 may perform one or more functions described as being performed by another set of components shown in FIG. 16.

Figure 17:
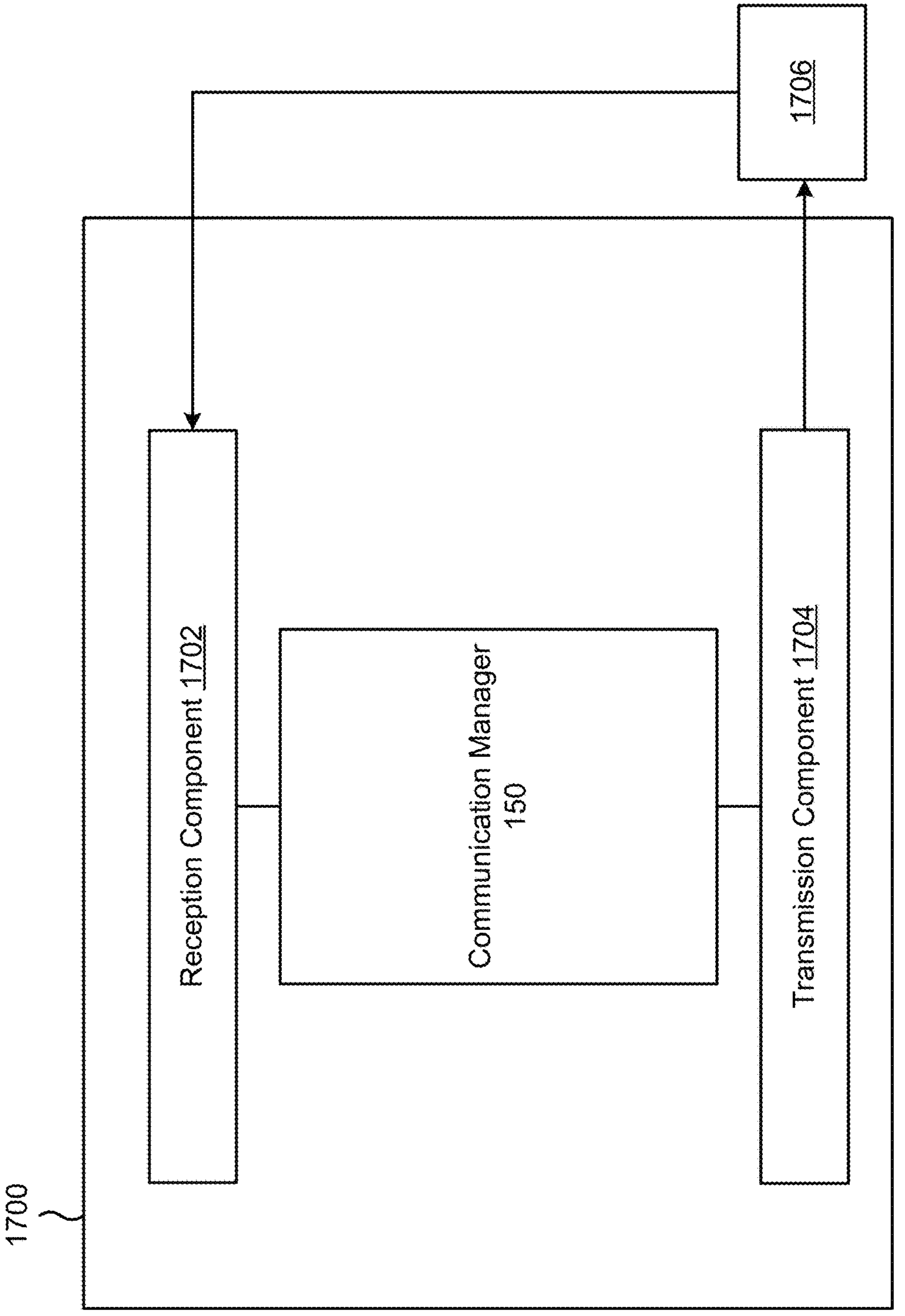
FIG. 17 is a diagram of an example apparatus, such as a network node, for wireless communication that supports SSBs for SBFD.

FIG. 17 is a diagram of an example apparatus 1700 for wireless communication that supports SSBs for SBFD. The apparatus 1700 may be a network node, or a network node may include the apparatus 1700. In some aspects, the apparatus 1700 includes a reception component 1702, a transmission component 1704, and a communication manager 150, which may be in communication with one another (for example, via one or more buses). As shown, the apparatus 1700 may communicate with another apparatus 1706 (such as a UE, a network node, or another wireless communication device) using the reception component 1702 and the transmission component 1704.

In some aspects, the apparatus 1700 may be configured to and/or operable to perform one or more operations described herein in connection with FIGS. 10-13. Additionally or alternatively, the apparatus 1700 may be configured to and/or operable to perform one or more processes described herein, such as process 1500 of FIG. 15. In some aspects, the apparatus 1700 may include one or more components of the network node described above in connection with FIG. 2.

The reception component 1702 may receive communications, such as reference signals, control information, and/or data communications, from the apparatus 1706. The reception component 1702 may provide received communications to one or more other components of the apparatus 1700, such as the communication manager 150. In some aspects, the reception component 1702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1702 may include one or more antennas, one or more modems, one or more demodulators, one or more MIMO detectors, one or more receive processors, one or more controllers/processors, and/or one or more memories of the network node described above in connection with FIG. 2.

The transmission component 1704 may transmit communications, such as reference signals, control information, and/or data communications, to the apparatus 1706. In some aspects, the communication manager 150 may generate communications and may transmit the generated communications to the transmission component 1704 for transmission to the apparatus 1706. In some aspects, the transmission component 1704 may perform signal processing on the generated communications (such as filtering, amplification, modulation, digital-to-analog conversion, multiplexing, interleaving, mapping, or encoding, among other examples), and may transmit the processed signals to the apparatus 1706. In some aspects, the transmission component 1704 may include one or more antennas, one or more modems, one or more modulators, one or more transmit MIMO processors, one or more transmit processors, one or more controllers/processors, and/or one or more memories of the network node described above in connection with FIG. 2. In some aspects, the transmission component 1704 may be co-located with the reception component 1702 in one or more transceivers.

The communication manager 150 may transmit or may cause the transmission component 1704 to transmit a first indication of one or more transmitted SSBs in an SS burst. The communication manager 150 may transmit or may cause the transmission component 1704 to transmit a second indication of at least one SSB, of the one or more transmitted SSBs, that is associated with an SSB-RO mapping between the at least one SSB and at least one RO configured in one or more SBFD symbols. The communication manager 150 may receive or may cause the reception component 1702 to receive, in accordance with the second indication, a RACH message in the at least one RO. In some aspects, the communication manager 150 may perform one or more operations described elsewhere herein as being performed by one or more components of the communication manager 150. The communication manager 150 may include one or more controllers/processors, one or more memories, one or more schedulers, and/or one or more communication units of the network node described above in connection with FIG. 2.

The transmission component 1704 may transmit a first indication of one or more transmitted SSBs in an SS burst. The transmission component 1704 may transmit a second indication of at least one SSB, of the one or more transmitted SSBs, that is associated with an SSB-RO mapping between the at least one SSB and at least one RO configured in one or more SBFD symbols. The reception component 1702 may receive, in accordance with the second indication, a RACH message in the at least one RO.

The number and arrangement of components shown in FIG. 17 are provided as an example. In practice, there may be additional components, fewer components, different components, or differently arranged components than those shown in FIG. 17. Furthermore, two or more components shown in FIG. 17 may be implemented within a single component, or a single component shown in FIG. 17 may be implemented as multiple, distributed components. Additionally or alternatively, a set of (one or more) components shown in FIG. 17 may perform one or more functions described as being performed by another set of components shown in FIG. 17.

The following provides an overview of some Aspects of the present disclosure:

Aspect 1: A method of wireless communication performed by a UE, comprising: receiving a first indication of one or more transmitted SSBs in an SS burst; receiving a second indication of at least one SSB, of the one or more transmitted SSBs, associated with an SSB-RO mapping between the at least one SSB and at least one RO configured in one or more SBFD symbols; and transmitting, in accordance with the second indication, a RACH message in the at least one RO.

Aspect 2: The method of Aspect 1, wherein the second indication comprises a bitmap that includes one or more bits indicating the at least one SSB that is associated with the SSB-RO mapping.

Aspect 3: The method of Aspect 2, wherein the first indication comprises another bitmap, and wherein the bitmap and the other bitmap have equal bit lengths.

Aspect 4: The method of Aspect 2, wherein the bitmap has a bit length equal to a total quantity of the one or more transmitted SSBs.

Aspect 5: The method of any of Aspects 1-4, wherein the second indication is associated with ROs configured in SBFD slots and ROs configured in half-duplex slots.

Aspect 6: The method of any of Aspects 1-5, wherein the second indication is specific to ROs configured in SBFD slots.

Aspect 7: The method of any of Aspects 1-6, wherein the SSB-RO mapping is associated with a single RACH configuration, and wherein the SSB-RO mapping is further between the one or more transmitted SSBs and one or more ROs configured in half-duplex slots.

Aspect 8: A method of wireless communication performed by a network node, comprising: transmitting a first indication of one or more transmitted SSBs in an SS burst; transmitting a second indication of at least one SSB, of the one or more transmitted SSBs, that is associated with an SSB-RO mapping between the at least one SSB and at least one RO configured in one or more SBFD symbols; and receiving, in accordance with the second indication, a RACH message in the at least one RO.

Aspect 9: The method of Aspect 8, wherein the second indication comprises a bitmap that includes one or more bits indicating the at least one SSB that is associated with the SSB-RO mapping.

Aspect 10: The method of Aspect 9, wherein the first indication comprises another bitmap, and wherein the bitmap and the other bitmap have equal bit lengths.

Aspect 11: The method of Aspect 9, wherein the bitmap has a bit length equal to a total quantity of the one or more transmitted SSBs.

Aspect 12: The method of any of Aspects 8-11, wherein the second indication is associated with ROs configured in SBFD slots and ROs configured in half-duplex slots.

Aspect 13: The method of any of Aspects 8-12, wherein the second indication is specific to ROs configured in SBFD slots.

Aspect 14: The method of any of Aspects 8-13, wherein the SSB-RO mapping is associated with a single RACH configuration, and wherein the SSB-RO mapping is further between the one or more transmitted SSBs and one or more ROs configured in half-duplex slots.

Aspect 15: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 1-14.

Aspect 16: An apparatus for wireless communication at a device, the apparatus comprising one or more memories and one or more processors coupled to the one or more memories, the one or more processors configured to cause the device to perform the method of one or more of Aspects 1-14.

Aspect 17: An apparatus for wireless communication, the apparatus comprising at least one means for performing the method of one or more of Aspects 1-14.

Aspect 18: A non-transitory computer-readable medium storing code for wireless communication, the code comprising instructions executable by one or more processors to perform the method of one or more of Aspects 1-14.

Aspect 19: A non-transitory computer-readable medium storing a set of instructions for wireless communication, the set of instructions comprising one or more instructions that, when executed by one or more processors of a device, cause the device to perform the method of one or more of Aspects 1-14.

Aspect 20: A device for wireless communication, the device comprising a processing system that includes one or more processors and one or more memories coupled with the one or more processors, the processing system configured to cause the device to perform the method of one or more of Aspects 1-14.

Aspect 21: An apparatus for wireless communication at a device, the apparatus comprising one or more memories and one or more processors coupled to the one or more memories, the one or more processors individually or collectively configured to cause the device to perform the method of one or more of Aspects 1-14.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term “component” is intended to be broadly construed as hardware or a combination of hardware and at least one of software or firmware. “Software” shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein. A component being configured to perform a function means that the component has a capability to perform the function, and does not require the function to be actually performed by the component, unless noted otherwise.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

As used herein, the term "determine" or "determining" encompasses a wide variety of actions and, therefore, "determining" can include calculating, computing, processing, deriving, investigating, looking up (such as via looking up in a table, a database or another data structure), identifying, inferring, ascertaining, measuring, and the like. Also, "determining" can include receiving (such as receiving information or receiving an indication), accessing (such as accessing data stored in memory), transmitting (such as transmitting information) and the like. Also, "determining" can include resolving, selecting, obtaining, choosing, establishing and other such similar actions. The term "identify" or "identifying" also encompasses a wide variety of actions and, therefore, "identifying" can include calculating, computing, processing, deriving, investigating, looking up (such as via looking up in a table, a database or another data structure), inferring, ascertaining, measuring, and the like. Also, "identifying" can include receiving (such as receiving information or receiving an indication), accessing (such as accessing data stored in memory), transmitting (such as transmitting information) and the like. Also, "identifying" can include resolving, selecting, obtaining, choosing, establishing and other such similar actions.

As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, as used herein, "based on" is intended to be interpreted in the inclusive sense, unless otherwise explicitly indicated. For example, "based on" may be used interchangeably with "based at least in part on," "associated with", or "in accordance with" unless otherwise explicitly indicated. Specifically, unless a phrase refers to "based on only 'a,'" or the equivalent in context, whatever it is that is "based on 'a,'" or "based at least in part on 'a,'" may be based on "a" alone or based on a combination of "a" and one or more other factors, conditions or information. Also, as used herein, the term "or" is intended to be inclusive when used in a series and may be used interchangeably with "and/or," unless explicitly stated otherwise (for example, if used in combination with "either" or "only one of"). It should be understood that "one or more" is equivalent to "at least one."

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set.

What is claimed is:

1. An apparatus for wireless communication at a user equipment (UE), comprising:

one or more memories storing processor-executable code; and one or more processors coupled with the one or more memories, at least one processor of the one or more processors configured to cause the UE to:

receive a first indication of one or more transmitted synchronization signal blocks (SSBs) in a synchronization signal (SS) burst;

receive a second indication of at least one SSB, of the one or more transmitted SSBs, associated with an SSB to random access channel occasion (SSB-RO) mapping between the at least one SSB and at least one random access channel (RACH) occasion (RO) configured in one or more subband full duplex (SBFD) symbols, wherein the second indication comprises a bitmap that includes one or more bits indicating the at least one SSB that is associated with the SSB-RO mapping; and transmit, in accordance with the second indication, a RACH message in the at least one RO.

2. The apparatus of claim 1, wherein the first indication comprises another bitmap, and wherein the bitmap and the other bitmap have equal bit lengths.

3. The apparatus of claim 1, wherein the bitmap has a bit length equal to a total quantity of the one or more transmitted SSBs.

4. The apparatus of claim 1, wherein the second indication is associated with ROs configured in SBFD slots and ROs configured in half-duplex slots.

5. The apparatus of claim 1, wherein the second indication is specific to ROs configured in SBFD slots.

6. The apparatus of claim 1, wherein the SSB-RO mapping is associated with a single RACH configuration, and wherein the SSB-RO mapping is further between the one or more transmitted SSBs and one or more ROs configured in half-duplex slots.

7. The apparatus of claim 1, wherein the first indication is an ssb-PositionsInBurst information element.

8. An apparatus for wireless communication at a network node, comprising:

one or more memories storing processor-executable code; and one or more processors coupled with the one or more memories, at least one processor of the one or more processors configured to cause the network node to:

transmit a first indication of one or more transmitted synchronization signal blocks (SSBs) in a synchronization signal (SS) burst;

transmit a second indication of at least one SSB, of the one or more transmitted SSBs, that is associated with an SSB to random access channel occasion (SSB-RO) mapping between the at least one SSB and at least one random access channel (RACH) occasion (RO) configured in one or more subband full duplex (SBFD) symbols, wherein the second indication comprises a bitmap that includes one or more bits indicating the at least one SSB that is associated with the SSB-RO mapping; and receive, in accordance with the second indication, a RACH message in the at least one RO.

9. The apparatus of claim 8, wherein the first indication comprises another bitmap, and wherein the bitmap and the other bitmap have equal bit lengths.

10. The apparatus of claim 8, wherein the bitmap has a bit length equal to a total quantity of the one or more transmitted SSBs.

11. The apparatus of claim 8, wherein the second indication is associated with ROs configured in SBFD slots and ROs configured in half-duplex slots.

12. The apparatus of claim 8, wherein the second indication is specific to ROs configured in SBFD slots.

13. The apparatus of claim 8, wherein the SSB-RO mapping is associated with a single RACH configuration, and wherein the SSB-RO mapping is further between the one or more transmitted SSBs and one or more ROs configured in half-duplex slots.

14. A method of wireless communication performed at a user equipment (UE), comprising:

receiving a first indication of one or more transmitted synchronization signal blocks (SSBs) in a synchronization signal (SS) burst;

receiving a second indication of at least one SSB, of the one or more transmitted SSBs, associated with an SSB to random access channel occasion (SSB-RO) mapping between the at least one SSB and at least one random access channel (RACH) occasion (RO) configured in one or more subband full duplex (SBFD) symbols, wherein the second indication comprises a bitmap that includes one or more bits indicating the at least one SSB that is associated with the SSB-RO mapping; and transmitting, in accordance with the second indication, a RACH message in the at least one RO.

15. The method of claim 14, wherein the first indication comprises another bitmap, and wherein the bitmap and the other bitmap have equal bit lengths.

16. The method of claim 14, wherein the bitmap has a bit length equal to a total quantity of the one or more transmitted SSBs.

17. The method of claim 14, wherein the second indication is associated with ROs configured in SBFD slots and ROs configured in half-duplex slots.

18. The method of claim 14, wherein the second indication is specific to ROs configured in SBFD slots.

19. The method of claim 14, wherein the SSB-RO mapping is associated with a single RACH configuration, and wherein the SSB-RO mapping is further between the one or more transmitted SSBs and one or more ROs configured in half-duplex slots.

20. The method of claim 14, wherein the first indication is an ssb-PositionsInBurst information element.

* * * * *